(12) United States Patent
Kakigi

(10) Patent No.: US 8,437,032 B2
(45) Date of Patent: May 7, 2013

(54) IMAGE PROCESSING APPARATUS AND IMAGE PROCESSING METHOD WITHIN INCLINATION ANGLE CORRECTION

(75) Inventor: Nobuyoshi Kakigi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 647 days.

(21) Appl. No.: 12/681,827

(22) PCT Filed: Dec. 19, 2008

(86) PCT No.: PCT/JP2008/073888
§ 371 (c)(1),
(2), (4) Date: Apr. 6, 2010

(87) PCT Pub. No.: WO2009/082017
PCT Pub. Date: Jul. 2, 2009

(65) Prior Publication Data
US 2010/0231929 A1    Sep. 16, 2010

(30) Foreign Application Priority Data

Dec. 21, 2007  (JP) .................................. 2007-330977
Dec. 12, 2008  (JP) .................................. 2008-317282

(51) Int. Cl.
*G06F 15/00* (2006.01)
*H04N 1/04* (2006.01)

(52) U.S. Cl.
USPC .......................................... 358/1.2; 358/474

(58) Field of Classification Search ................... 358/1.1, 358/1.7, 3.2, 3.27, 1.18, 505, 528, 409, 451, 358/474, 486, 488, 496; 382/167
See application file for complete search history.

(56) References Cited

U.S. PATENT DOCUMENTS

| 5,430,550 A | * | 7/1995 | Hashimoto et al. ........... 358/488 |
| 5,721,793 A | * | 2/1998 | Ushida et al. .................. 382/300 |
| 7,515,747 B2 | | 4/2009 | Okutomi et al. .............. 382/167 |
| 2006/0175414 A1 | * | 8/2006 | Nakamura ............... 235/462.09 |
| 2008/0024823 A1 | * | 1/2008 | Nakagawa .................... 358/1.16 |
| 2008/0074712 A1 | * | 3/2008 | Nakagawa .................... 358/474 |

FOREIGN PATENT DOCUMENTS

| JP | 7-193690 | 7/1995 |
| JP | 7-240833 | 9/1995 |
| JP | 9-018674 | 1/1997 |

(Continued)

OTHER PUBLICATIONS

International Preliminary Report on Patentability from corresponding PCT Application No. PCT/JP2008/073888, dated Jul. 1, 2010.

*Primary Examiner* — Gabriel Garcia
(74) *Attorney, Agent, or Firm* — Fitzpatrick, Cella, Harper & Scinto

(57) ABSTRACT

An image processing apparatus has an area sensor unit that reads image data corresponding to a plurality of frames shifted from each other by a shift of less than one pixel, an inclination angle acquiring unit that acquires an inclination angle with respect to a reference installation position of the area sensor, an angle correcting unit that corrects the inclination of the image data corresponding to a plurality of frames read by the area sensor unit by using the acquired inclination angle, and a high-resolution conversion unit that provides image data the resolution of which is higher than the resolution of the read image data by using the image data corresponding to a plurality of frames the inclination of which has been corrected by the angle correcting unit to perform interpolation processing.

34 Claims, 23 Drawing Sheets

FOREIGN PATENT DOCUMENTS

| | | |
|---|---|---|
| JP | 9-321948 | 12/1997 |
| JP | 2002-152525 | 5/2002 |
| JP | 2006-092450 | 4/2004 |
| WO | 2004/068862 | 8/2004 |

* cited by examiner

FIG. 7
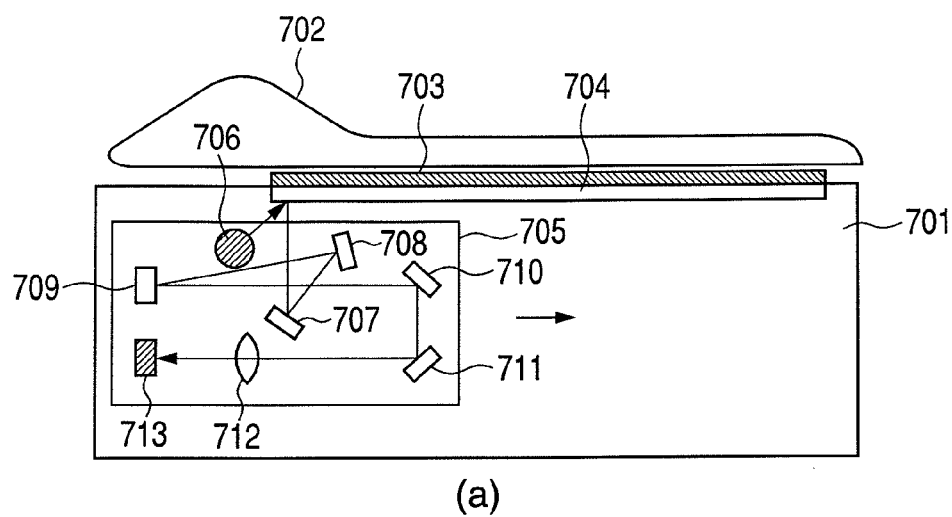
(a)
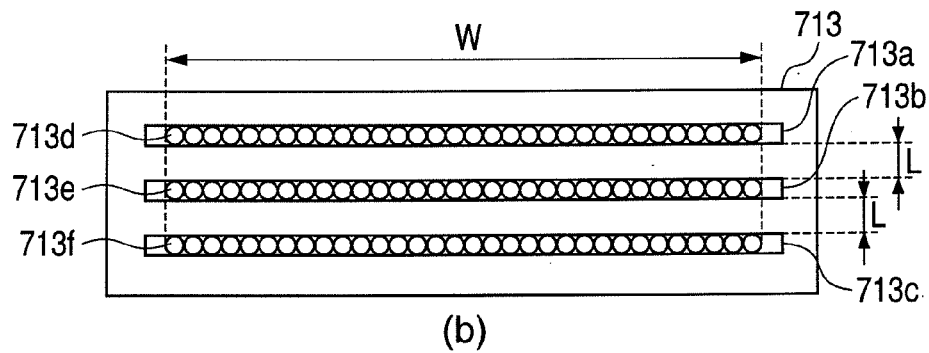
(b)
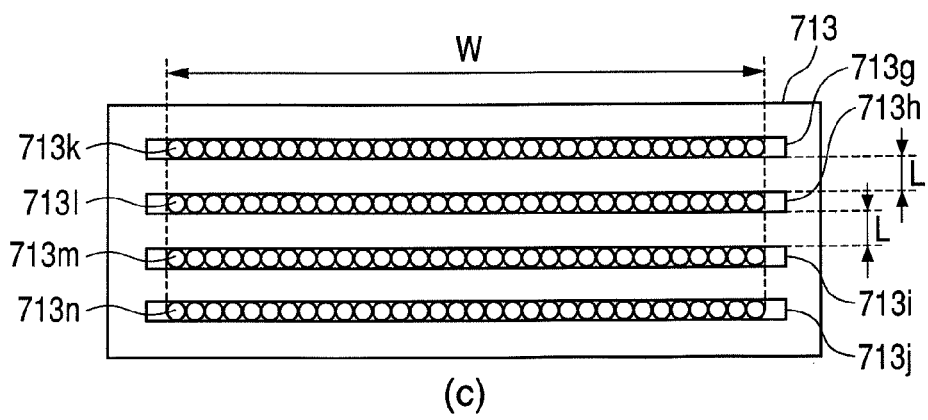
(c)

FIG. 8
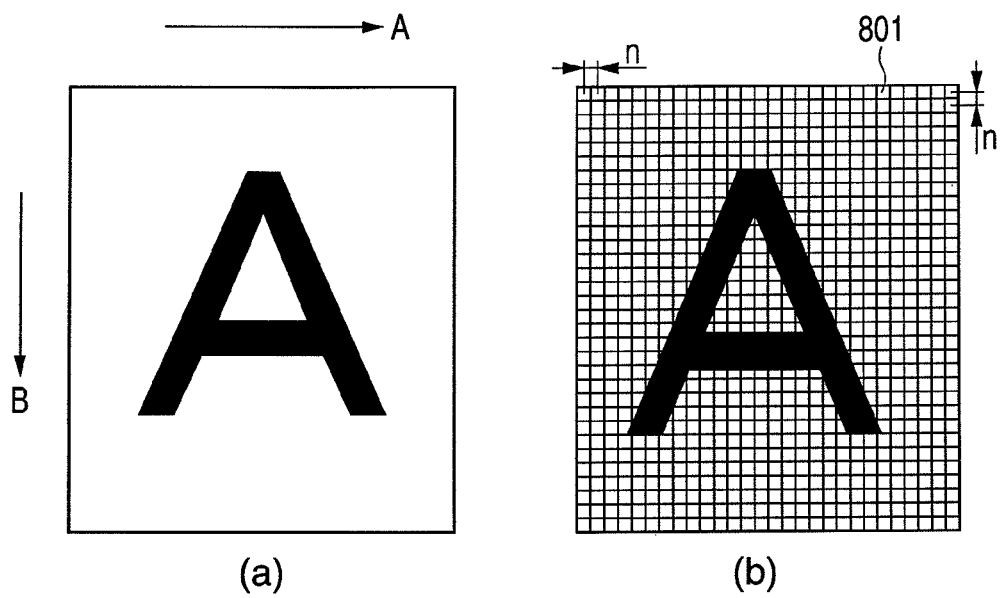
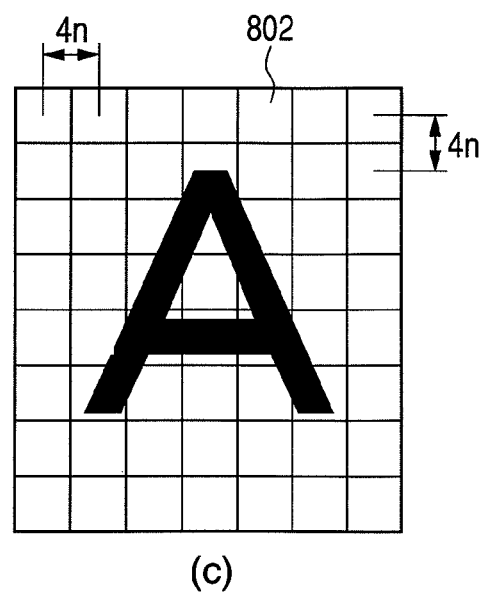

FIG. 9
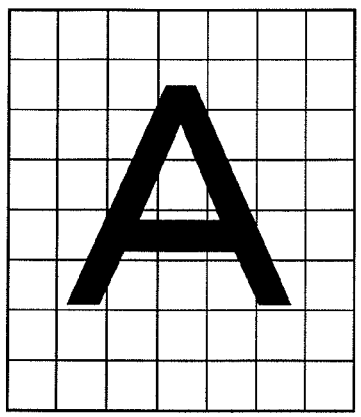
(a)
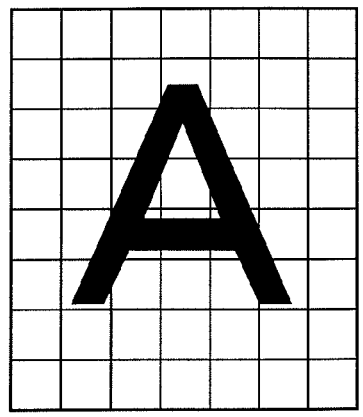
(b)
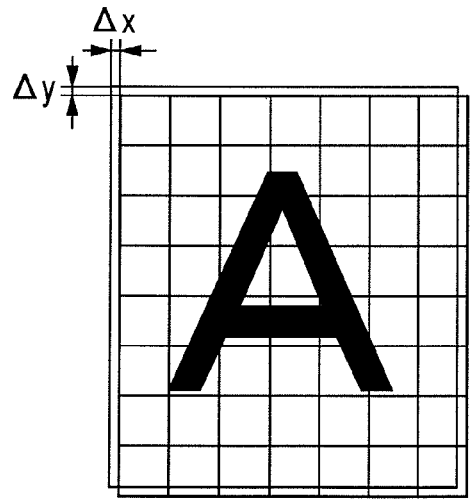
(c)
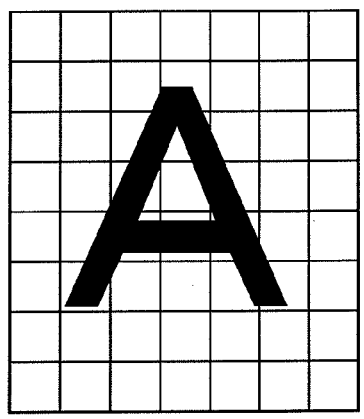
(d)
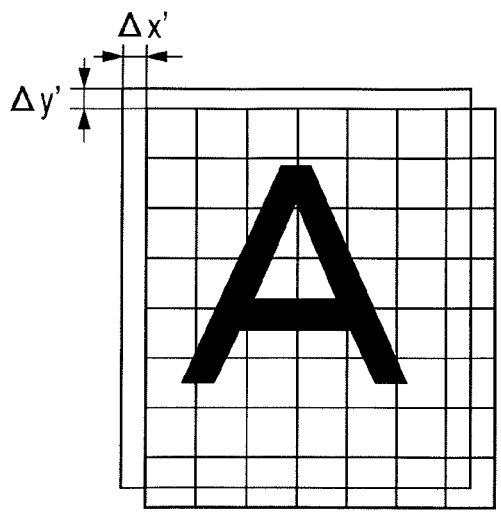
(e)
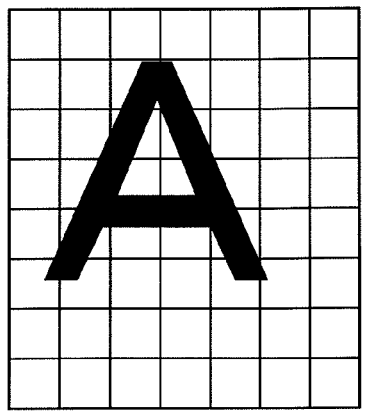
(f)

FIG. 10
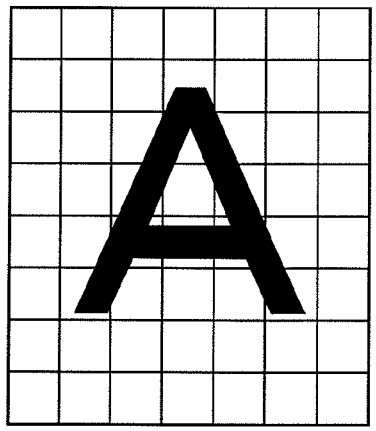
(a)
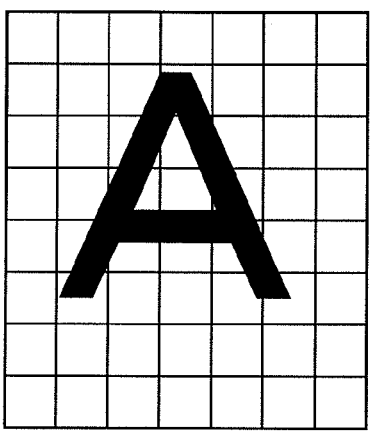
(b)
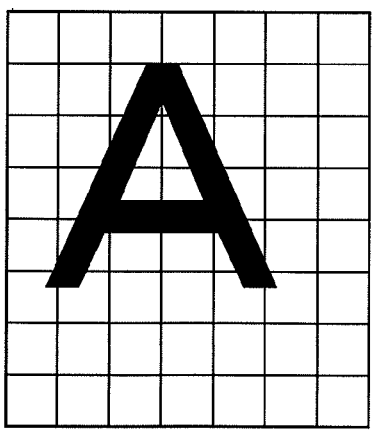
(c)
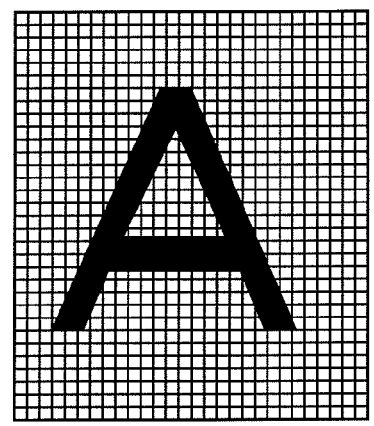
(d)

◇ PIXEL IN TARGET LOW-RESOLUTION IMAGE

● TARGET PIXEL FOR SUPER-RESOLUTION PROCESSING

FIG. 20
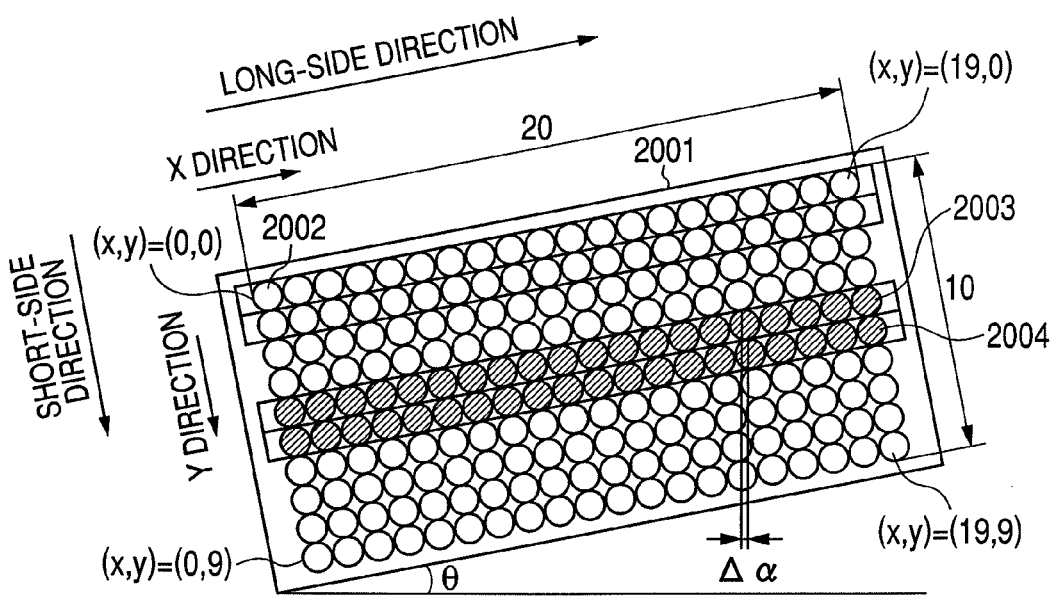
(a)
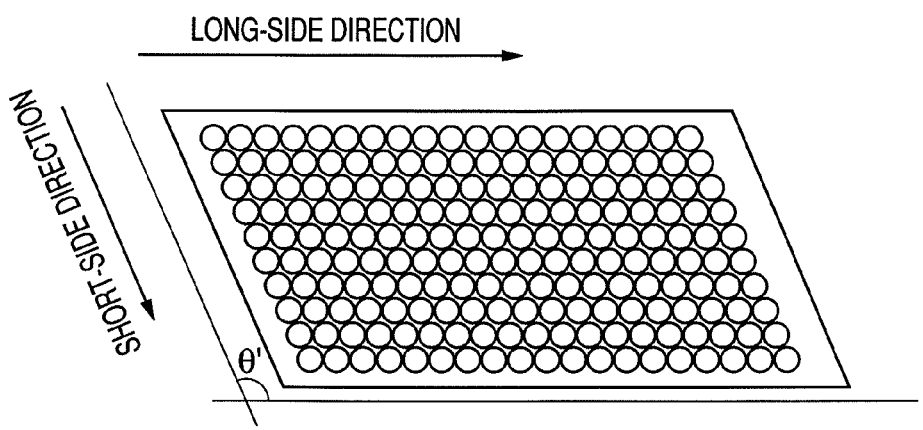
(b)

FIG. 27
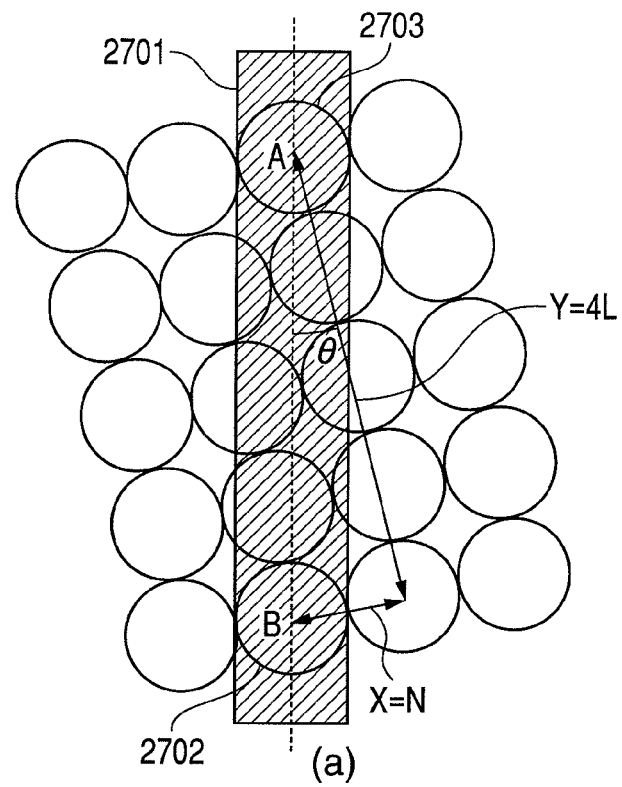
(a)
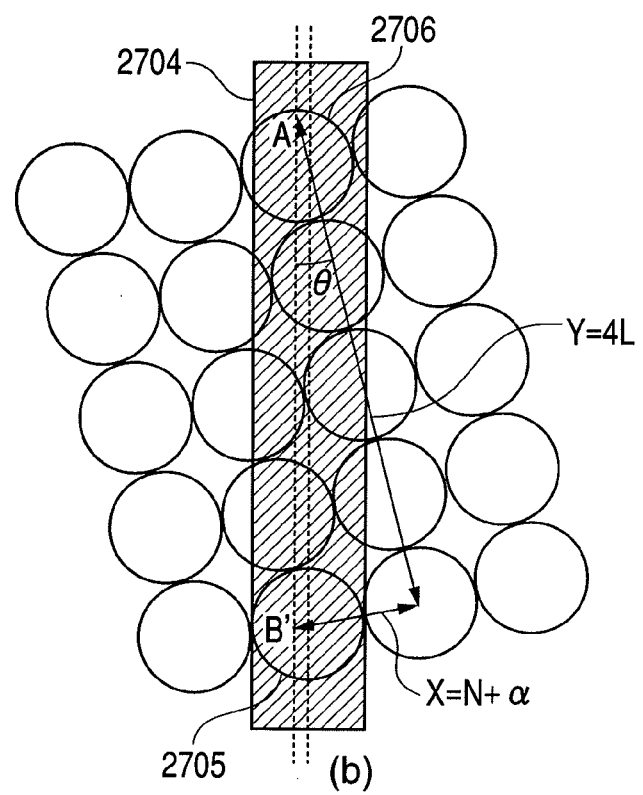
(b)

IMAGE PROCESSING APPARATUS AND IMAGE PROCESSING METHOD WITHIN INCLINATION ANGLE CORRECTION

TECHNICAL FIELD

The present invention relates to an image processing apparatus and an image processing method for reading an original document image and processes the image.

BACKGROUND ART

In recent years, it is an increasing trend that offices are networked and documents handled there are digitized and colored. Digitization allows documents to be readily processed and transferred for efficient operations. Colorization allows good-looking, effective documents to be created. As documents are increasingly digitized and colored, multifunction peripherals (MFPs), which are image processing apparatus, are required to effectively capture and output generated image data.

The configuration of an image processing apparatus including an image reader is an element most closely associated with one of original document image capturing performance and image quality of output images in a copy mode. The reader in an image processing apparatus is adapted to include a reduction optical system and a proximity optical system.

The reading resolution of the above optical systems depends on pixel sensors arranged in a primary scan direction. There is a technology called "super-resolution processing" as a process of improving the resolution independent of the number of pixel sensors arranged in a primary scan direction.

While the technology will be described later, the super-resolution processing involves using multiple sets of image data read at the resolution of the sensors provided in the reader to significantly improve the resolution of an output image.

Using the super-resolution processing technology allows image data corresponding to a plurality of frames, for example, read at a resolution of 300 dpi to be converted into image data having a resolution of 1200 dpi.

Processes involved in the super-resolution processing in which high-resolution image data that cannot be obtained by a reader in an image processing apparatus is produced by using multiple sets of image data are described in detail in WO2004/068862.

Japanese Patent Application Laid-Open No. 2006-092450 describes high-resolution processing in which the number of images used as a base of a combined image is controlled according to the image size. This technology involves increasing the number of images to be combined when the image size is small.

To carry out the super-resolution processing described above, however, first of all, it is necessary to prepare successive sets of image data corresponding to a plurality of frames obtained by reading an original document image with the reading position minutely shifted from one to the other with reference to one-frame image data read at the resolution of sensors provided in an image processing apparatus including a reader.

That is, it is necessary to prepare successive sets of image data corresponding to a plurality of frames obtained by slightly shifting the positions of pixels to be read in the primary and/or secondary scan directions from reference image data.

Further, when the image data corresponding to a plurality of frames is obtained, the position at which the original document image is read by a sensor to acquire image data is shifted from the position at which the original document image is read by the adjacent sensor to acquire image data. The shift needs to be smaller than one pixel (sub-pixel) in the primary and/or secondary scan directions.

The greater the resolution of image data generated by the super-resolution processing, the greater the number of necessary image data frames in the image data read at the resolution of the sensors provided in the apparatus.

Performing the super-resolution processing in an image processing apparatus thus allows a low-resolution reader to provide a high-resolution image. To this end, however, it is necessary to satisfy the conditions described above.

In general, however, the reader in a multifunction peripheral, a scanner, and other image processing apparatus uses a line sensor.

That is, the number of frames read in a single reading action is one.

Further, the reader described above reads an original document image by using a group of pixel sensors horizontally arranged in the primary scan direction with the distance between pixels being equal to an integral multiple of the size of a pixel. It is thus disadvantageously not possible to read the original document image by minutely (on a sub-pixel basis) shifting the positions of pixels to be read in the primary scan direction.

DISCLOSURE OF THE INVENTION

To solve the above problems, an image processing apparatus of the present invention comprises:

an area sensor unit that reads image data corresponding to a plurality of frames shifted from each other by a shift of less than one pixel;

an inclination angle acquiring unit that acquires an inclination angle with respect to a reference installation position of the area sensor;

an angle correcting unit that corrects the inclination of the image data corresponding to a plurality of frames read by the area sensor unit by using the inclination angle acquired by the inclination angle acquiring unit; and a high-resolution conversion unit that provides image data the resolution of which is higher than the resolution of the pixel sensors by using the image data corresponding to a plurality of frames the inclination of which has been corrected by the angle correcting unit to perform interpolation processing.

The present invention can provide an image processing apparatus capable of performing super-resolution processing in which multiple sets of low-resolution image data read by a sensor fixed in an inclined position with respect to a reference installation position are used to provide a high-resolution image.

Even image data read at a low resolution can thus be output as a high-resolution image.

Further features of the present invention will become apparent from the following description of exemplary embodiments with reference to the attached drawings.

(a), (b) and (c) of FIG. 7 illustrate a configuration diagram of a reduction optical system in a conventional MFP.

(a), (b) and (c) of FIG. 8 illustrate a super-resolution processing.

(a), (b), (c), (d), (e) and (f) of FIG. 9 illustrate a super-resolution processing.

(a), (b), (c) and (d) of FIG. 10 illustrate a super-resolution processing.

Figure 11:
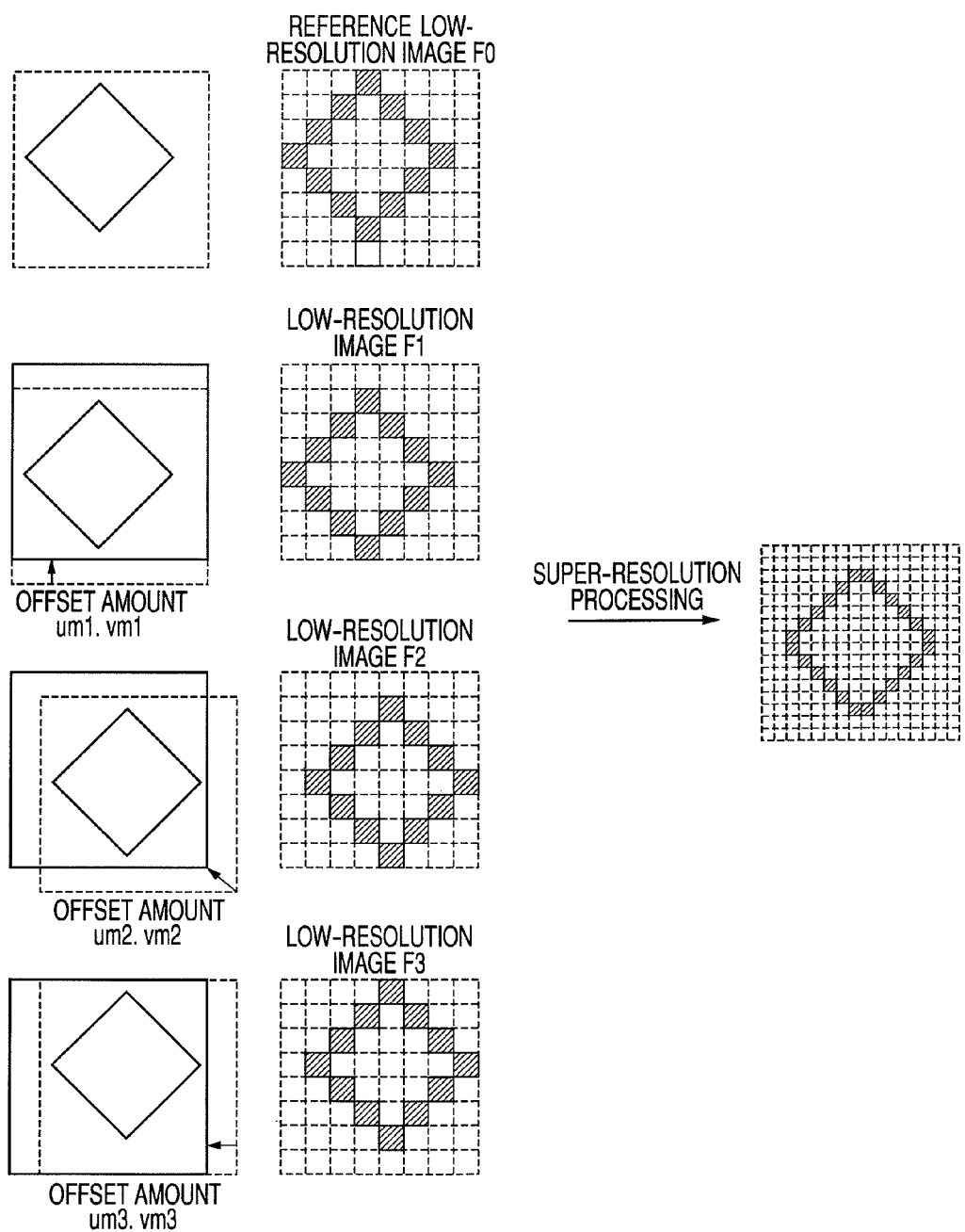

FIG. 11 describes super-resolution processing in detail.

Figure 12:
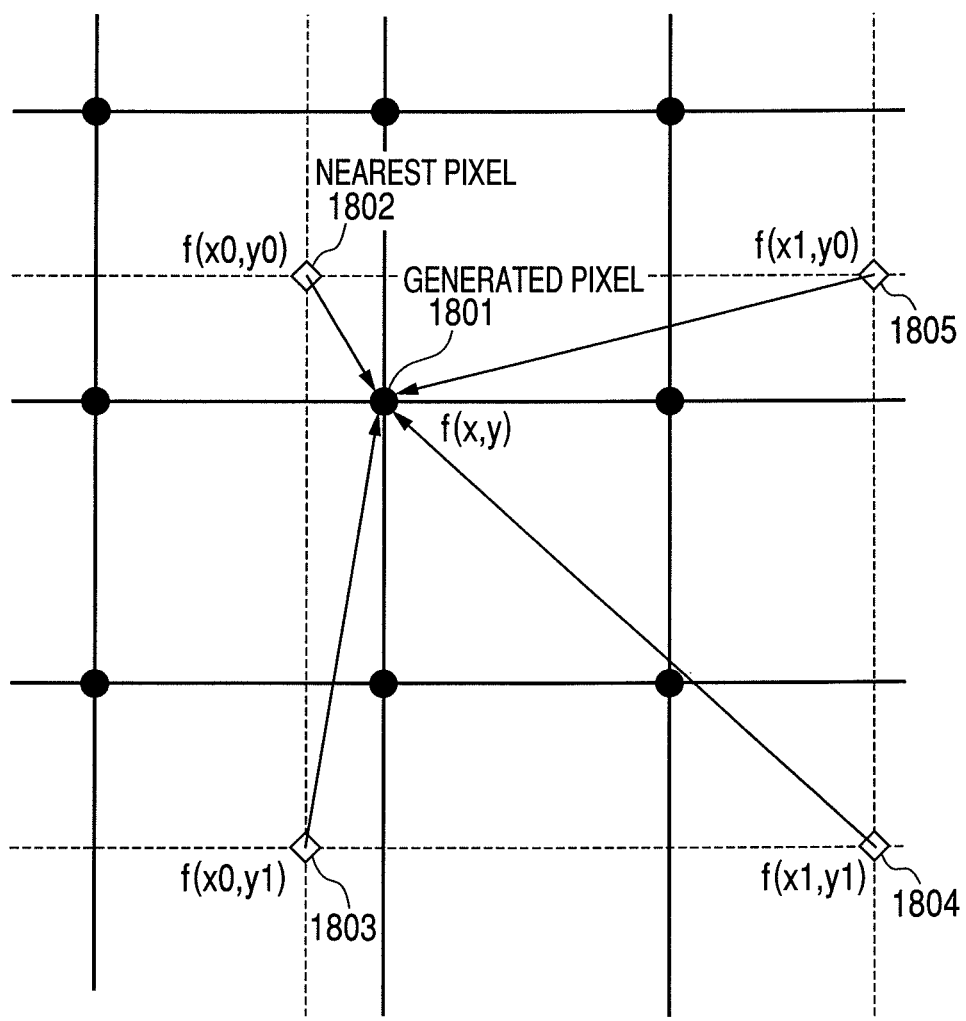

FIG. 12 describes super-resolution processing in detail.

Figure 13:
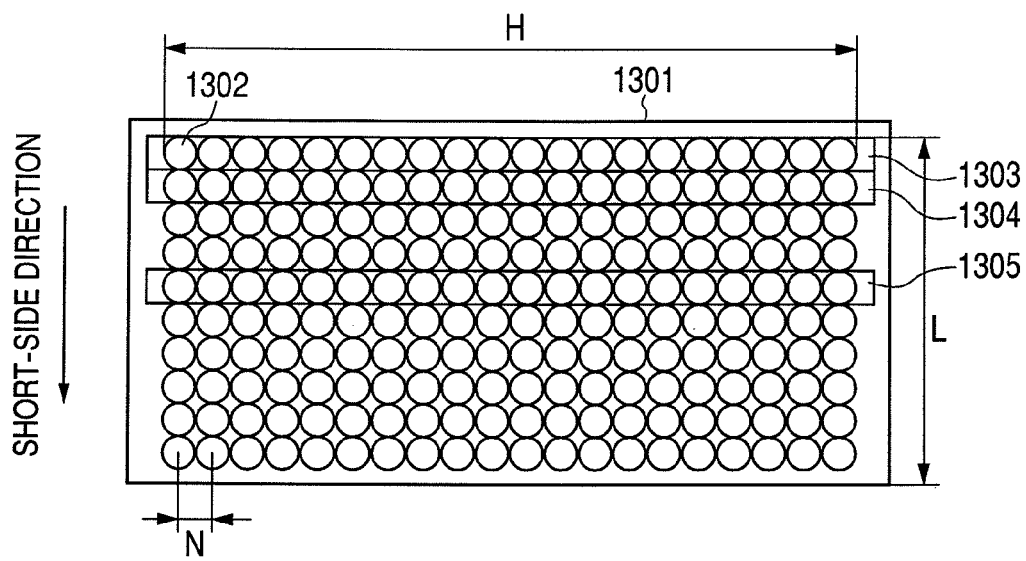

FIG. 13 illustrates the configuration of an area sensor.

Figure 14:
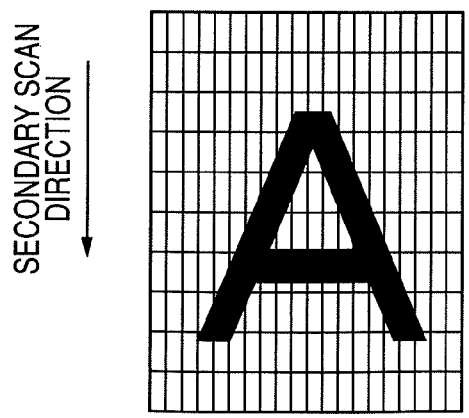

FIG. 14 illustrates an original document image to be read by the area sensor.

Figure 15:
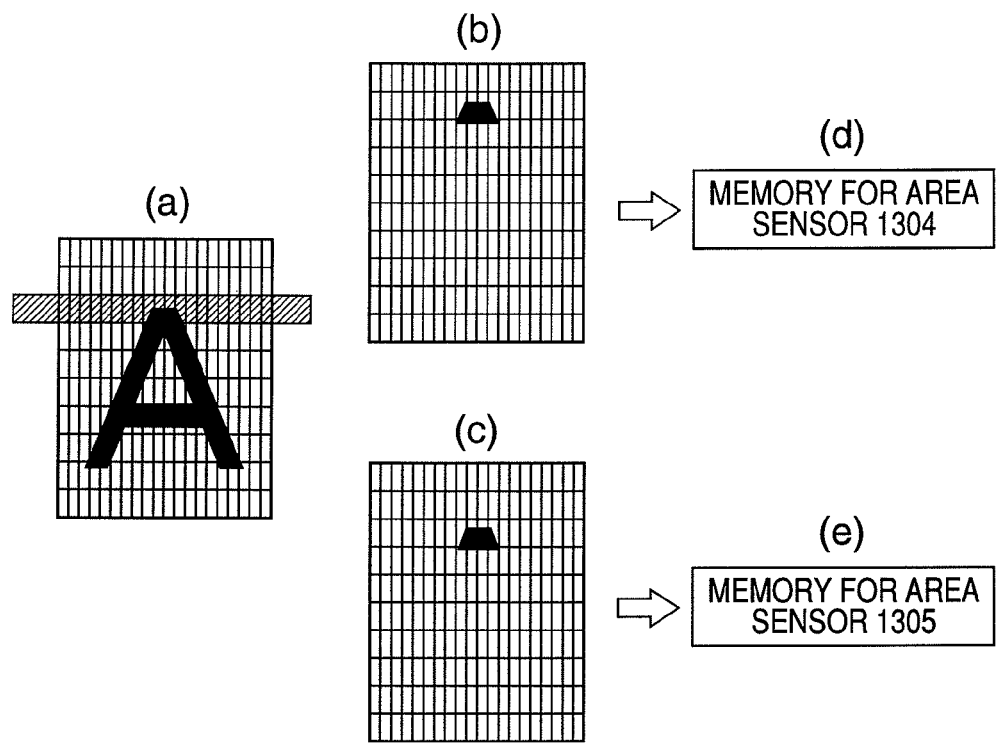

(a), (b), (c), (d) and (e) of FIG. 15 illustrate how to acquire line image data.

Figure 16:
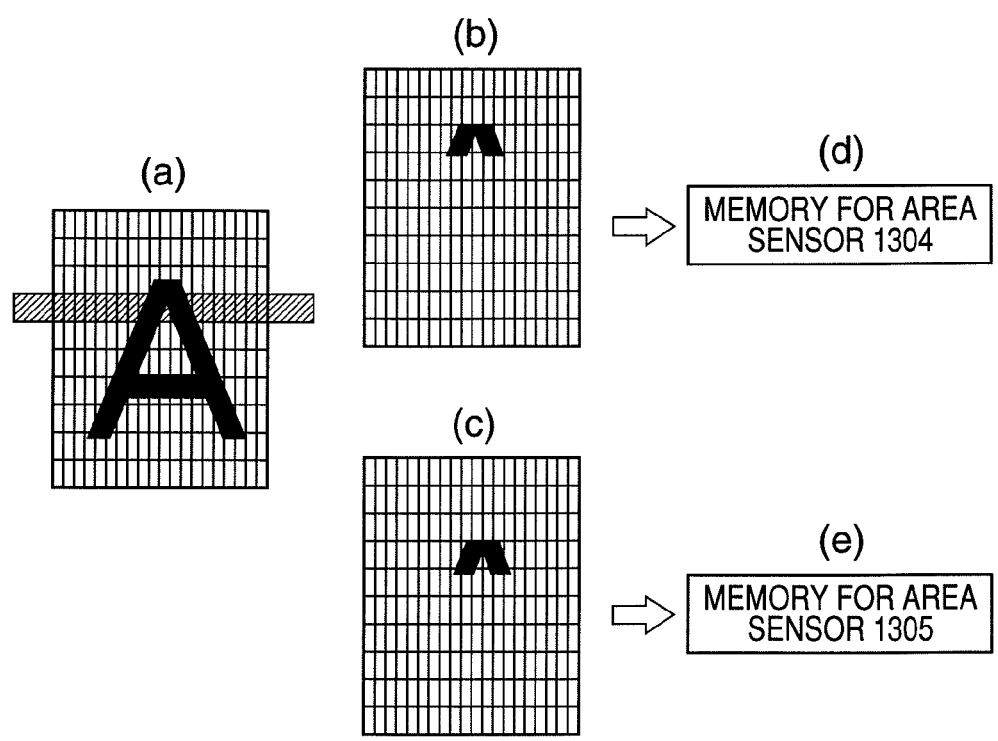

(a), (b), (c), (d) and (e) of FIG. 16 illustrate how to acquire line image data.

Figure 17:
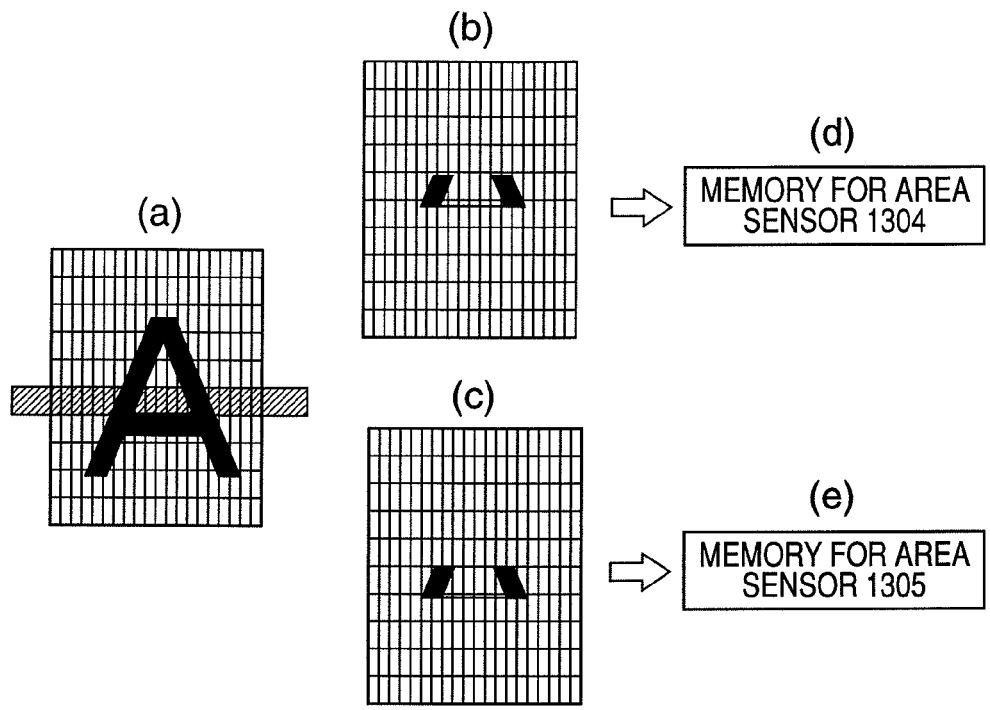

(a), (b), (c), (d) and (e) of FIG. 17 illustrate how to acquire line image data.

Figure 18:
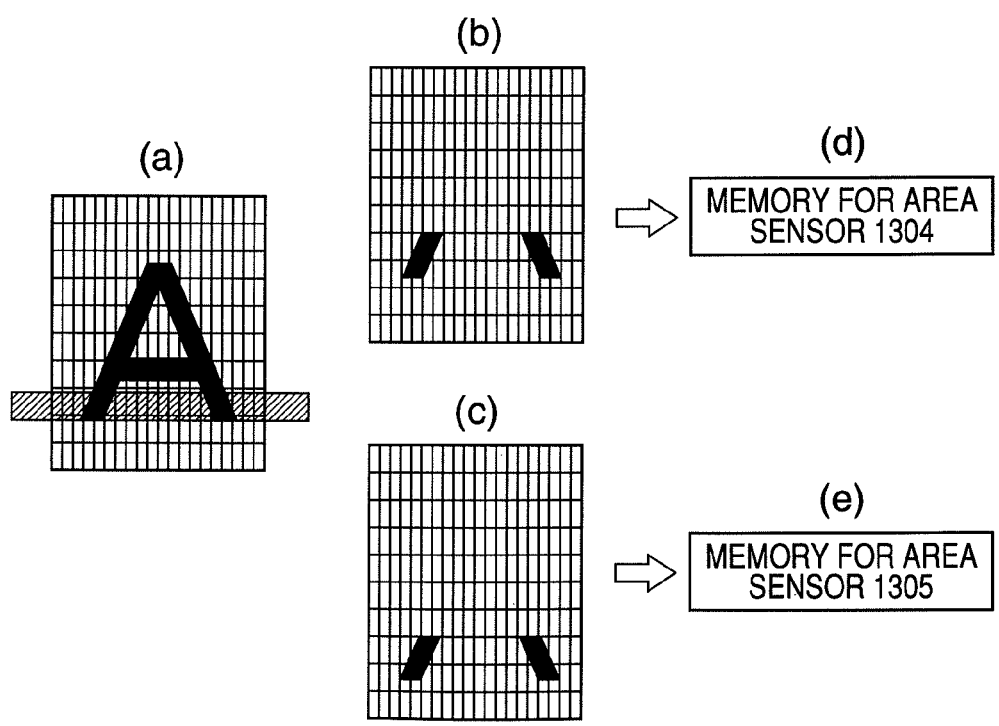

(a), (b), (c), (d) and (e) of FIG. 18 illustrate how to acquire line image data.

Figure 19:
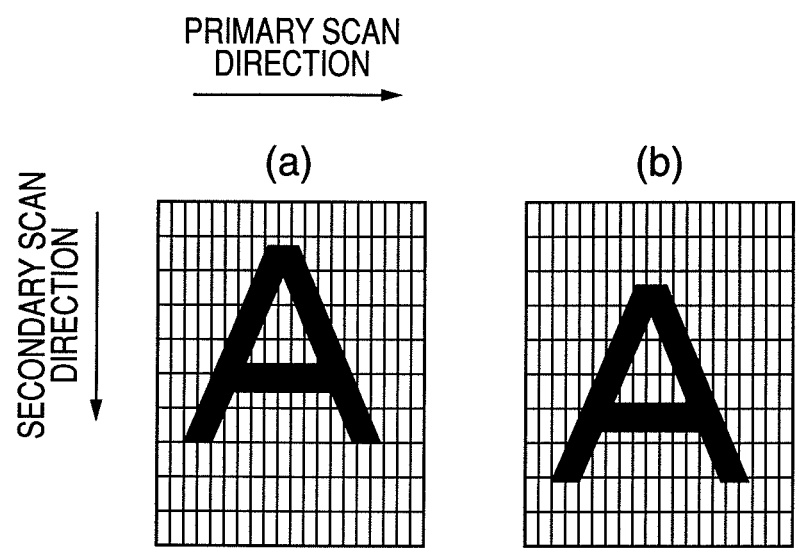

(a) and (b) of FIG. 19 illustrate image data read by line sensors in an area sensor.

(a) and (b) of FIG. 20 illustrate a configuration diagram when an area sensor is fixed in an inclined position.

Figure 21:
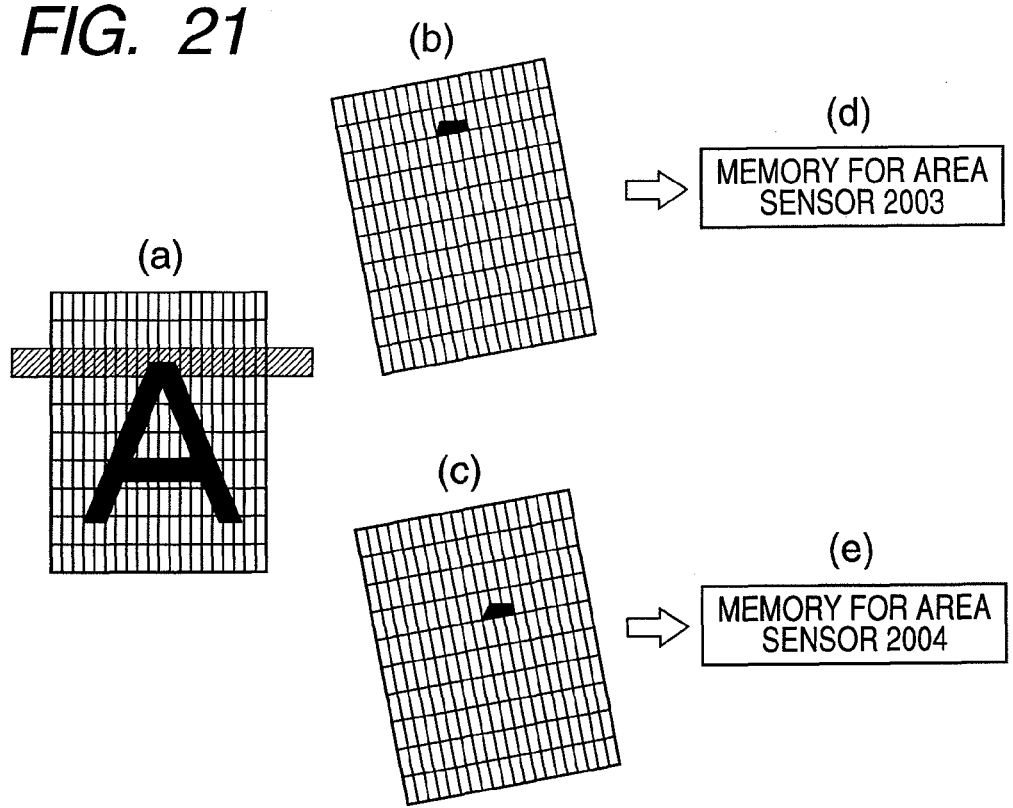

(a), (b), (c), (d) and (e) of FIG. 21 illustrate how an inclined area sensor acquires line image data.

Figure 22:
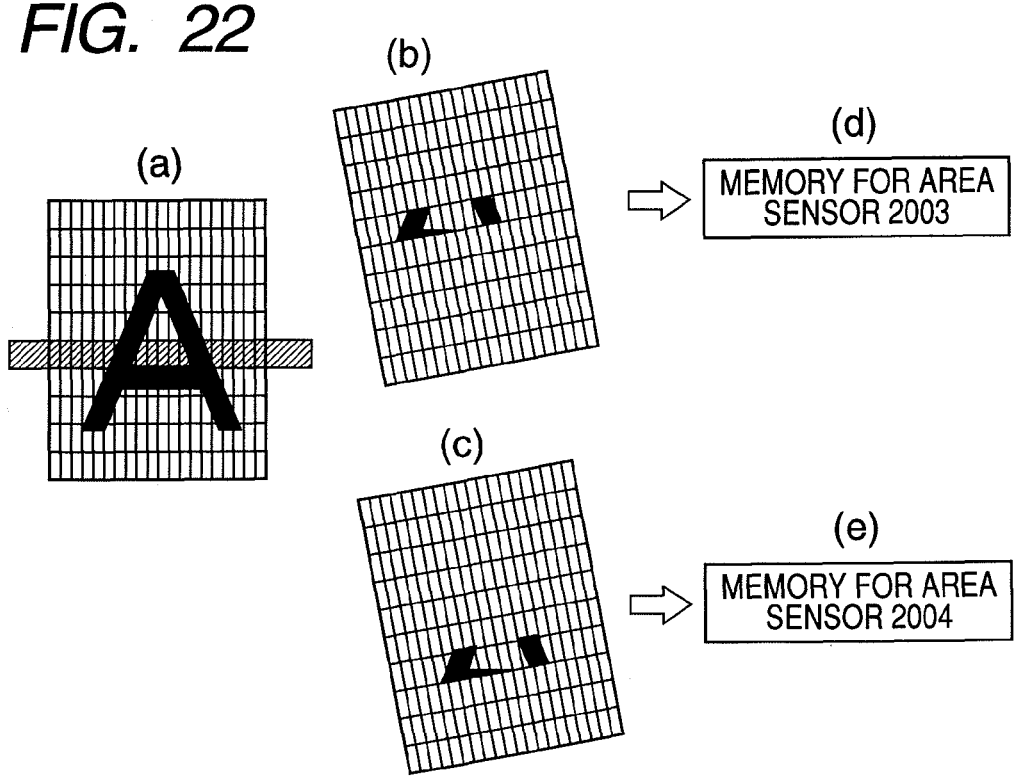

(a), (b), (c), (d) and (e) of FIG. 22 illustrate how an inclined area sensor acquires line image data.

Figure 23:
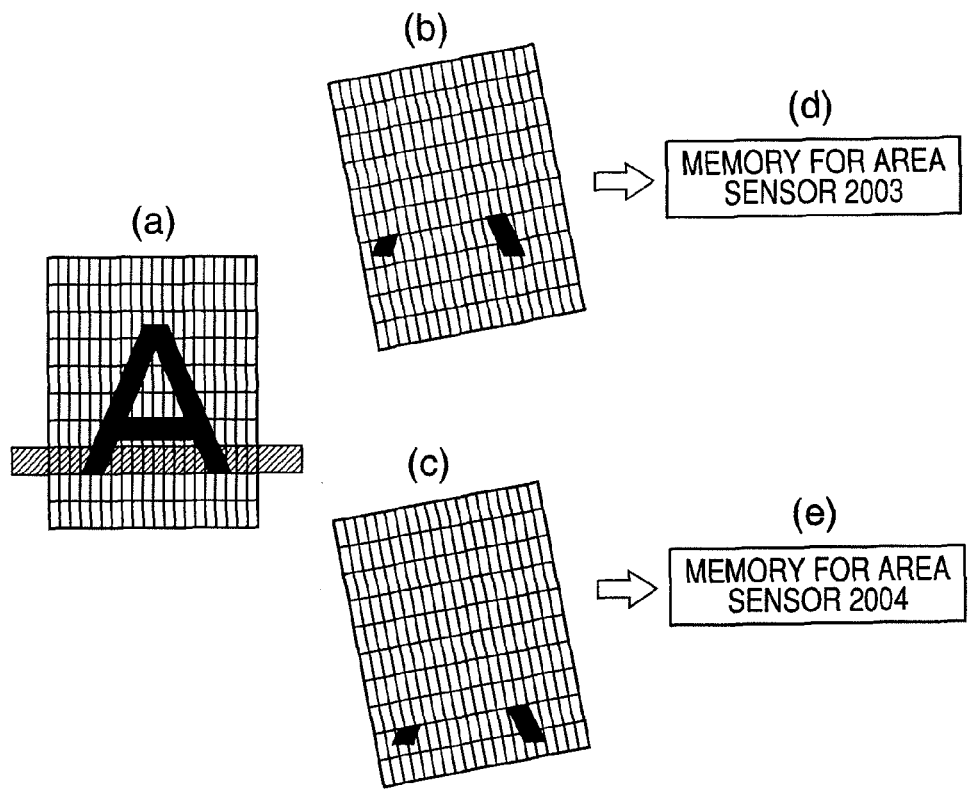

(a), (b), (c), (d) and (e) of FIG. 23 illustrate how an inclined area sensor acquires line image data.

Figure 24:
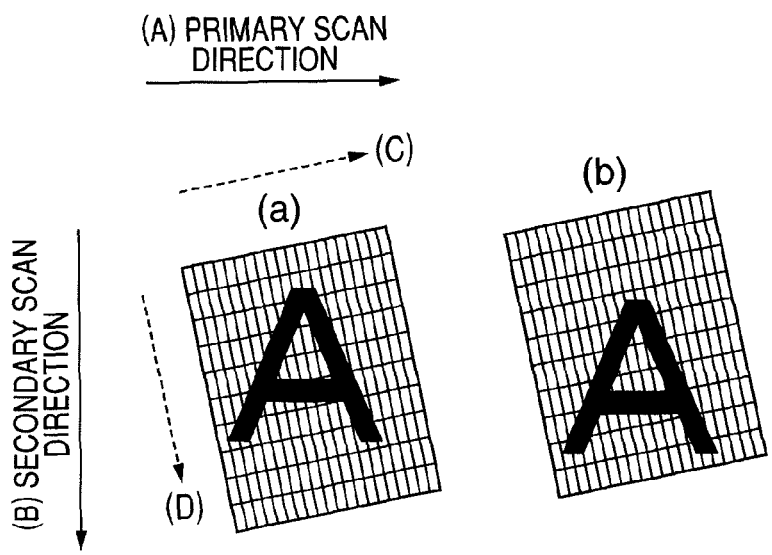

(a) and (b) of FIG. 24 illustrate image data read by line sensors in an inclined area sensor.

Figure 25:
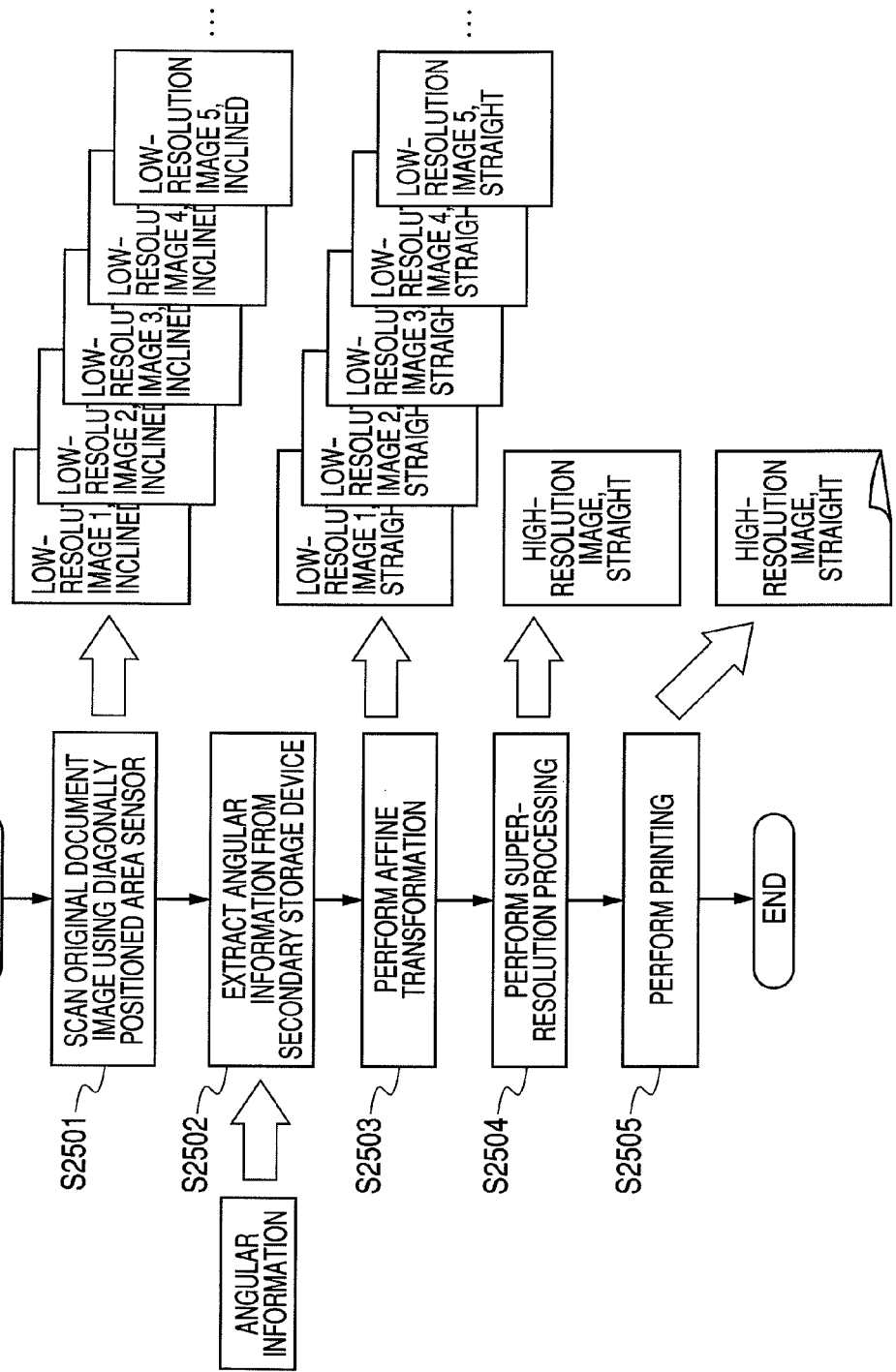

FIG. 25 is a flowchart describing a copy process of an MFP.

Figure 26:
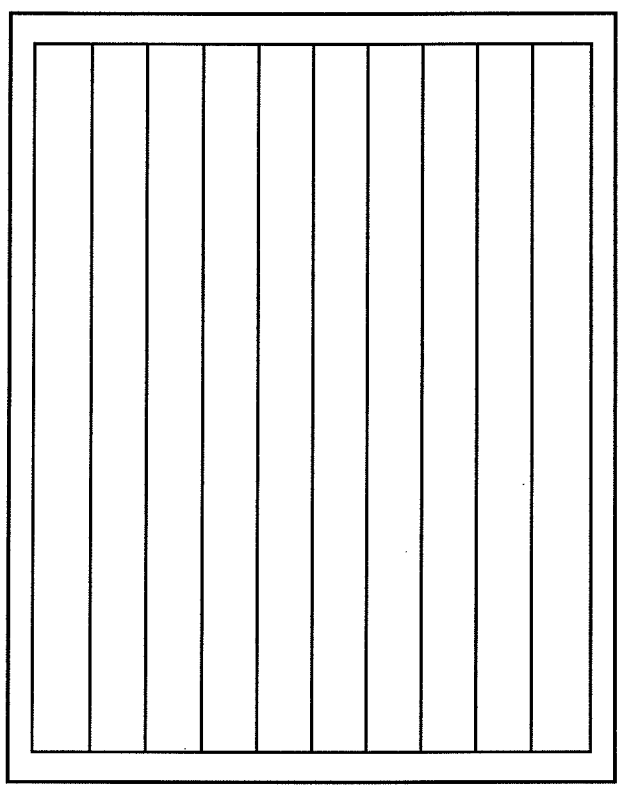

FIG. 26 illustrates an example of a test chart.

(a) and (b) of FIG. 27 illustrate a diagram describing a concept of a method for detecting the inclination of an area sensor.

Figure 28:
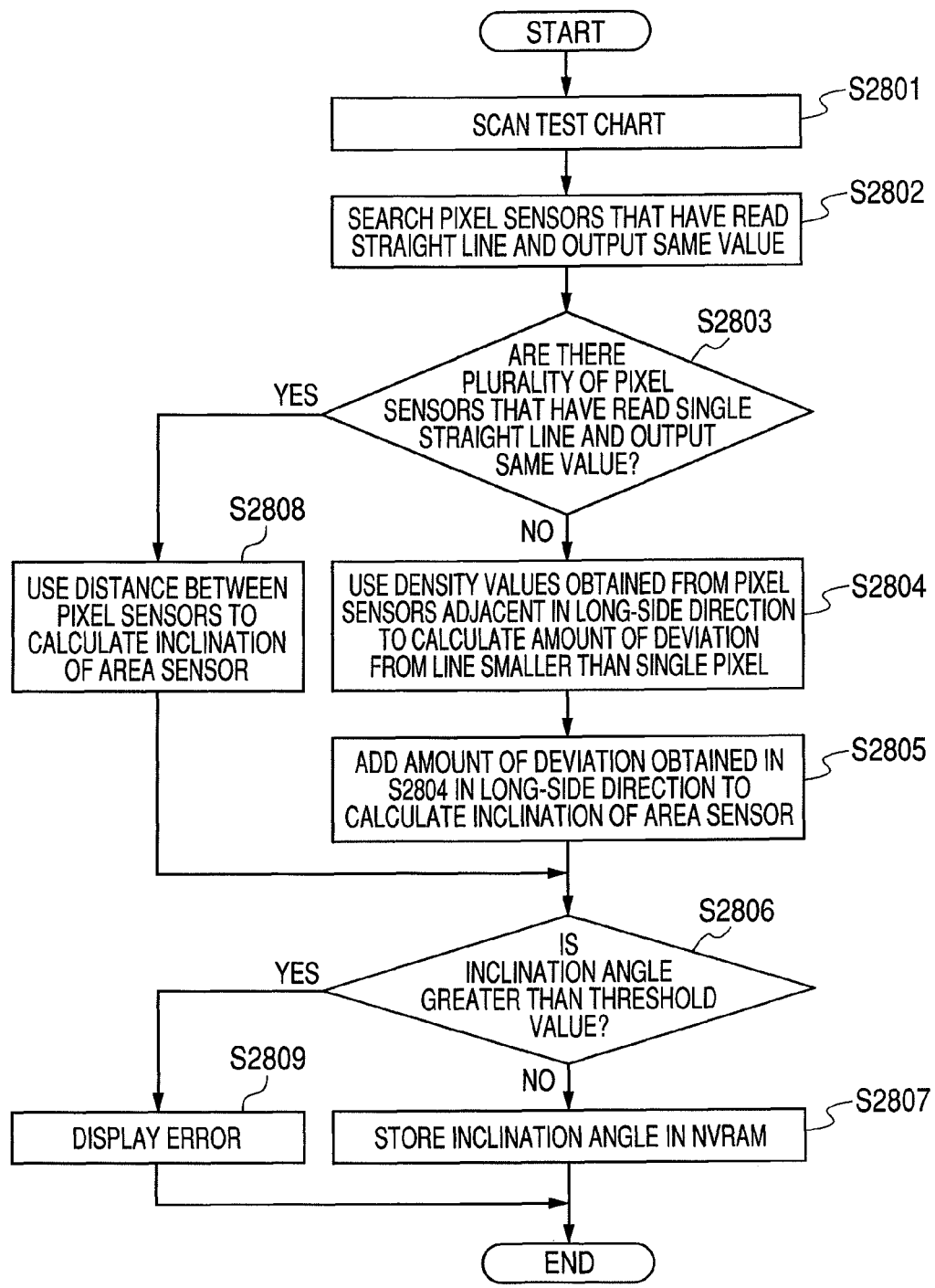

FIG. 28 is a flowchart describing a process of detecting the inclination of an area sensor.

Figure 29:
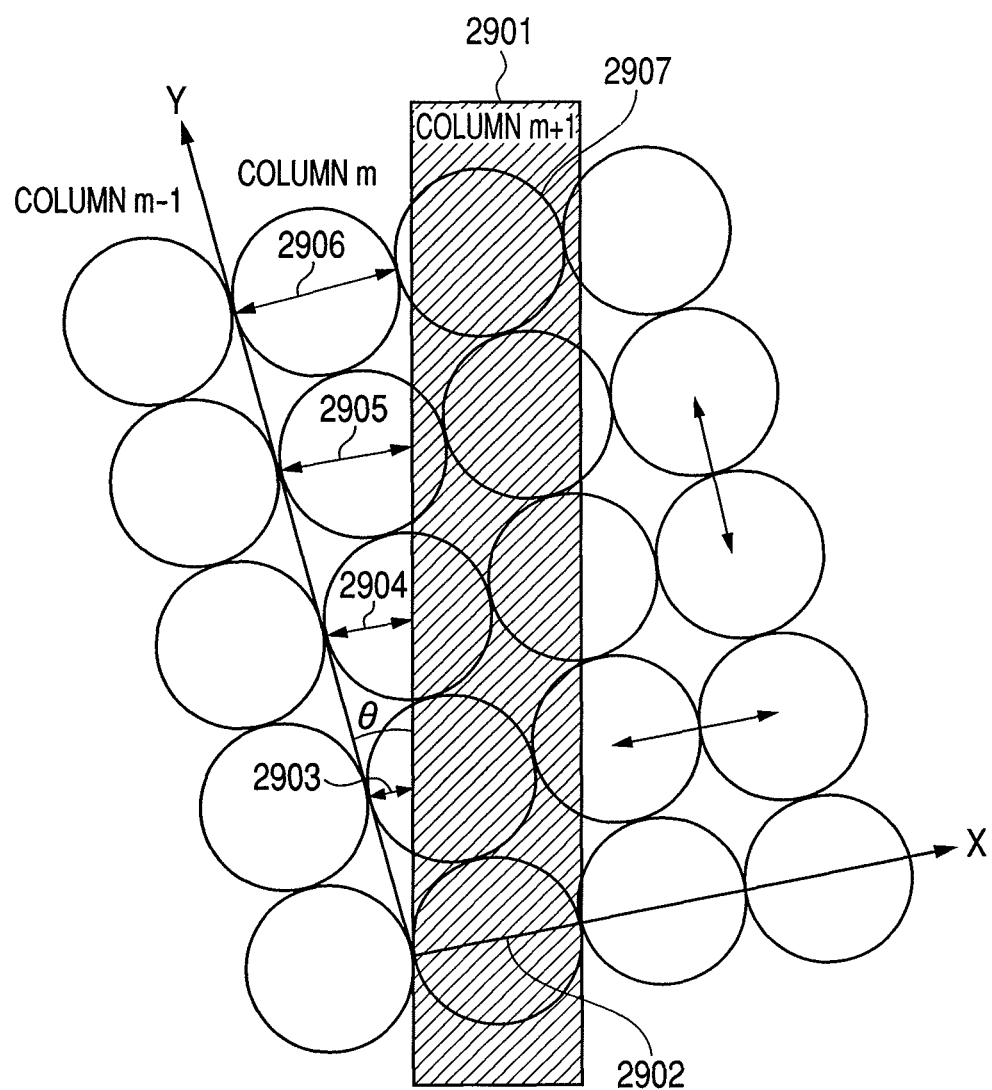

FIG. 29 is a diagram describing a process of acquiring an angle by using an area sensor to read a vertical line having a width corresponding to a single pixel and finding an edge of the line.

BEST MODES FOR CARRYING OUT THE INVENTION (Description of the Configuration of a Reader)

Figure 1:
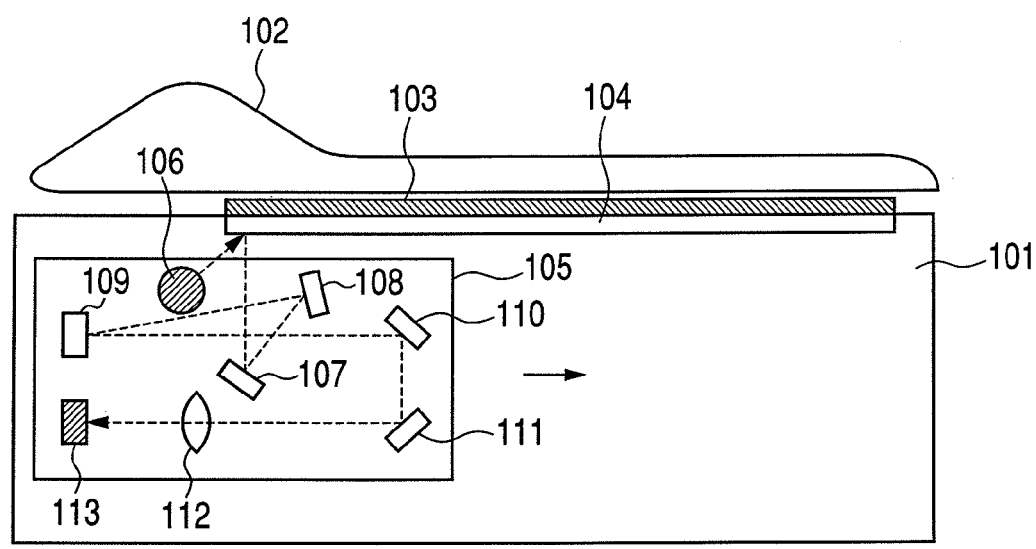
FIG. 1 illustrates the configuration of a reader in the present invention.

FIG. 1 illustrates the configuration of a reader. FIG. 1 illustrates an example of a reader in an image processing apparatus to which the present embodiment is applied.

FIG. 1 illustrates a body 101 of the reader, an ADF 102 that holds down an original document 103 and feeds the original document to an original document reading position when the original document is scanned, and a glass platen 104 on which the original document 103 is placed for reading of an original document image on the original document.

A unit 105 includes a reading device that reads the original document image 103, that is, a device that images the original document image. A light source 106 is a xenon lamp or other white-light sources. Mirrors 107 to 111 serve to reflect the light that is emitted from the light source 106 and illuminates the image, and deliver the reflected light to the imaging device. A lens 112 focuses the light reflected off the mirror 111 to match the size of the light with the width of the imaging device. FIG. 1 also illustrates the imaging device as an element 113.

Figure 2:
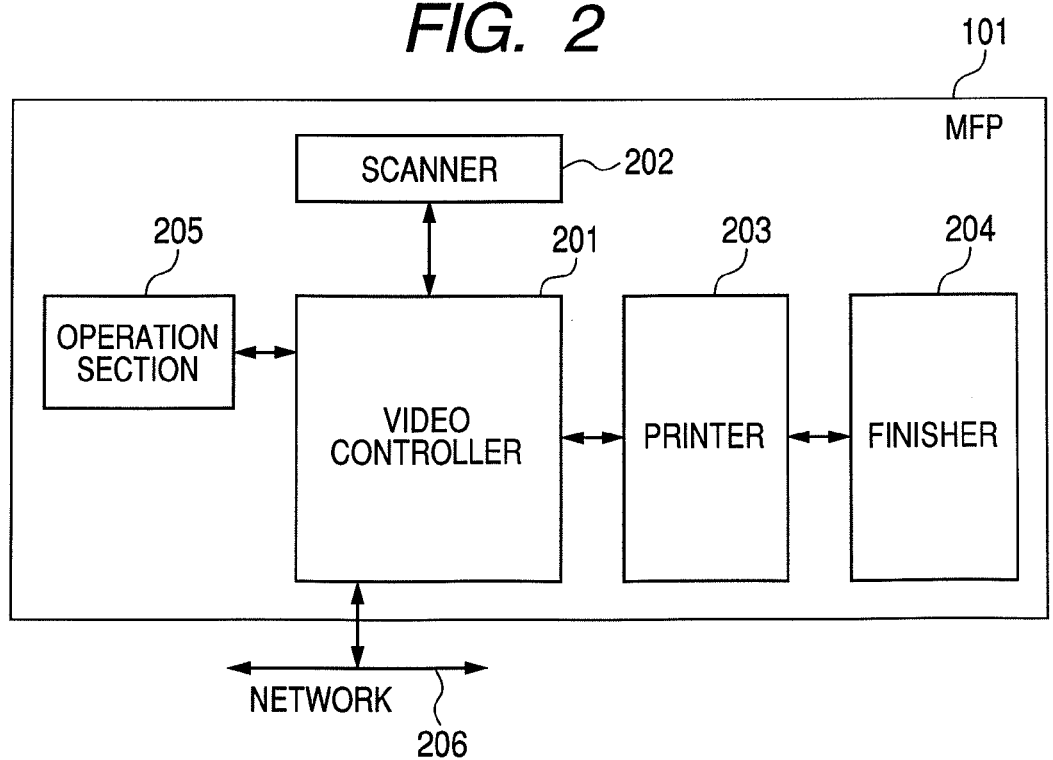
FIG. 2 illustrates the configuration of an MFP 101.

FIG. 2 illustrates an example of the configuration of the image processing apparatus in the present embodiment. The image processing apparatus is formed in the body 101 of the reader illustrated in FIG. 1. In FIG. 2, a video controller 201 controls the image processing apparatus illustrated in FIG. 1 and has the hardware configuration illustrated in FIG. 3, which will be described later. A scanner 202 optically reads an original document image under the control of the video controller 201, and a printer 203 prints an input image on a recording medium under the control of the video controller 201.

The printer 203 will be described with reference to an electrophotographic laser beam printer. A finisher 204 is connected to the printer 203. The finisher 204 can staple a plurality of recording media (printing sheets, for example) together that have been output from the printer 203.

The finisher 204 staples the output recording media and carries out other processes under the control of the video controller 201. A network (Ethernet®, for example) interface 206 provides two-way communication with the video controller 201 via the interface 206. The functions to be provided can be acquired by externally querying an overall management manager (supervisor), which will be described later, via the interface 206.

The functions to be provided include the number of maximum copies, the type of the finisher, supported PDLs, and the number of specifiable output BINs.

FIG. 2 also illustrates an operation section 205, which is a user interface (UI). The operation section 205 includes an LCD display and a keyboard, displays information from the video controller 201, and delivers an instruction from a user to the video controller 201.

The configuration of the MFP connected to the network 206 will be described in detail.

(Description of the Configuration of the Video Controller 201)

Figure 3:
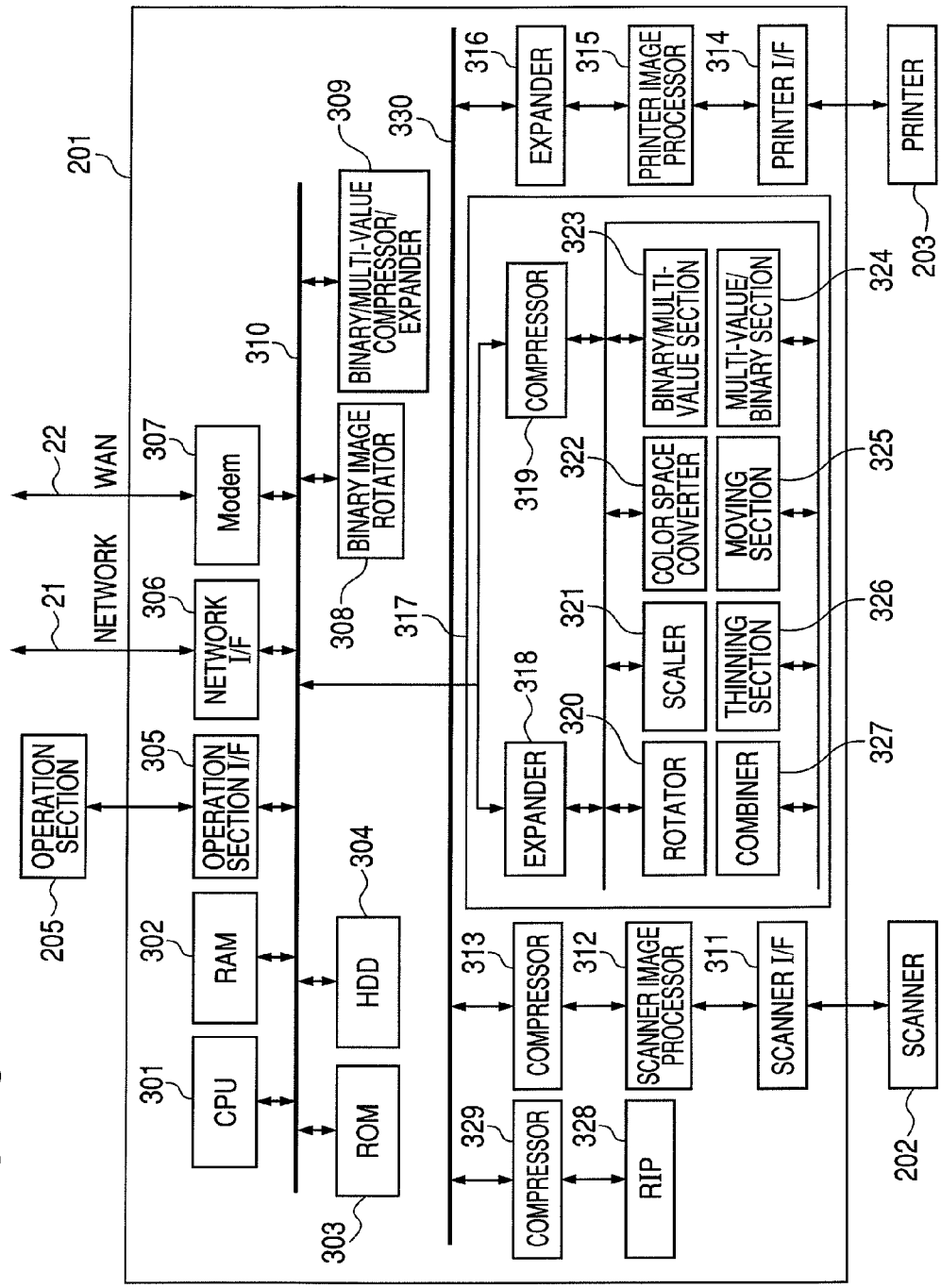
FIG. 3 illustrates the hardware configuration of a video controller 201.

FIG. 3 illustrates an example of the hardware configuration of the video controller 201 illustrated in FIG. 2.

The video controller 201 is not only electrically connected to the scanner 202 and the printer 203 but also connected to a print server (not illustrated) and an external apparatus via a network 21 and a WAN 22. It is thus possible to input and output image data and device information.

A CPU 301 carries out overall control of access to a variety of connected devices and also carries out overall control of a variety of processes performed in the video controller 201, for example, based on a control program stored in a ROM 303.

A RAM 302 is a system work memory used by the CPU 301 to operate, and temporality stores image data. The RAM 302 includes an SRAM that holds stored information even after the power is turned off and a DRAM that loses stored information after the power is turned off.

The ROM 303 stores a program that boots the apparatus and other programs. An HDD 304 is a hard disk drive and can store system software and image data.

An operation section I/F 305 is an interface that connects the operation section 205 to a system bus 310. The operation section I/F 305 receives image data to be displayed on the operation section 205 from the system bus 310 and outputs the image data to the operation section 205. The operation section I/F 305 also outputs information input from the operation section 205 to the system bus 310.

A network I/F 306 is connected to the network 206 and the system bus 310, and inputs and outputs information. A modem 307 is connected to a WAN 22 and the system bus 310, and inputs and outputs information. A binary image rotator 308 converts the direction of image data before transmitted. A binary image compressor/expander 309 converts the resolution of image data before transmitted into one of a predetermined resolution and a resolution that matches the ability of a communication counterpart. Compression and expansion will be carried out using JBIG, MMR, MR, MH, or other methods. An image bus 330 is a transmission path through which image data is transmitted, and comprised of one of a PCI bus and an IEEE 1394 bus.

A scanner image processor 312 corrects, processes, and edits image data received from the scanner 202 via a scanner I/F 311. The scanner image processor 312 determines whether received image data is a color original document image or a monochrome original document image, a character-based original document image, a photographic original document image, or other types of original document image. The determination result is imparted to the image data. The imparted information is referred to as attribute data. The processes performed in the scanner image processor 312 will be described later in detail.

A compressor 313 receives image data and divides the image data into blocks, each of which has a dimension of 32 pixels by 32 pixels. The image data having a dimension of 32 pixels by 32 pixels is referred to as tile data. In an original document image (paper-based medium that has not yet undergone a reading operation), an area corresponding to the tile data is referred to as a tile image. The tile data has header information including average brightness information in the 32×32 pixel block and coordinates of the tile image on the original document image. Further, the compressor 313 compresses image data comprised of multiple sets of tile data. An expander 316 expands image data comprised of multiple sets of tile data, arranges the image data in a raster format, and sends the resultant data to a printer image processor 315.

The printer image processor 315 receives the image data sent from the expander 316 and performs image processing on the image data while referring to the attribute data imparted to the image data. The image data that has undergone the image processing is output to the printer 203 via a printer I/F 314. The processes performed in the printer image processor 315 will be described later in detail.

An image converter 317 performs predetermined conversion processes on image data. The image converter 317 includes the following processors.

An expander 318 expands received image data. A compressor 319 compresses received image data. A rotator 320 rotates received image data. A scaler 321 performs resolution conversion (converting 600 dpi into 200 dpi, for example) on received image data. A color space converter 322 converts the color space of received image data. The color space converter 322 can perform known background skip, known LOG conversion (RGB→CMY), and known output color correction (CMY→CMYK) using one of a matrix and a table. A binary/multi-value converter 323 converts received binary image data into 256-grayscale image data. In contrast, a multi-value/binary converter 324 converts received 256-grayscale image data into binary image data, for example, by using error diffusion method.

A combiner 327 combines two sets of received image data to generate a single set of image data. Examples of a method for combining two sets of image data include a method in which brightness values of pixels to be combined are averaged to produce a combined brightness value and a method in which the brightness value of the pixel having a brighter level chosen from pixels to be combined is defined as the brightness value of the combined pixel. It is also possible to employ a method in which the pixel having a darker level chosen from pixels to be combined is defined as the combined pixel. It is further possible to employ a method in which the OR operation, AND operation, exclusive-OR operation, or other operations on pixels to be combined is used to determine the combined brightness value. All of the combination methods described above are known in the art. A thinning section 326 performs a thinning process on received image data for resolution conversion to produce smaller-sized image data by multiplying ½, ¼, ⅛ or other factors. A moving section 325 adds a margin to received image data or removes a margin from received image data.

An RIP 328 receives intermediate data generated based on PDL code data sent from the print server (not illustrated) or other components, produces (multi-value) bitmap data, and compresses the bitmap data in a compressor 329.

(Detailed Description of the Scanner Image Processor 312)

Figure 4:
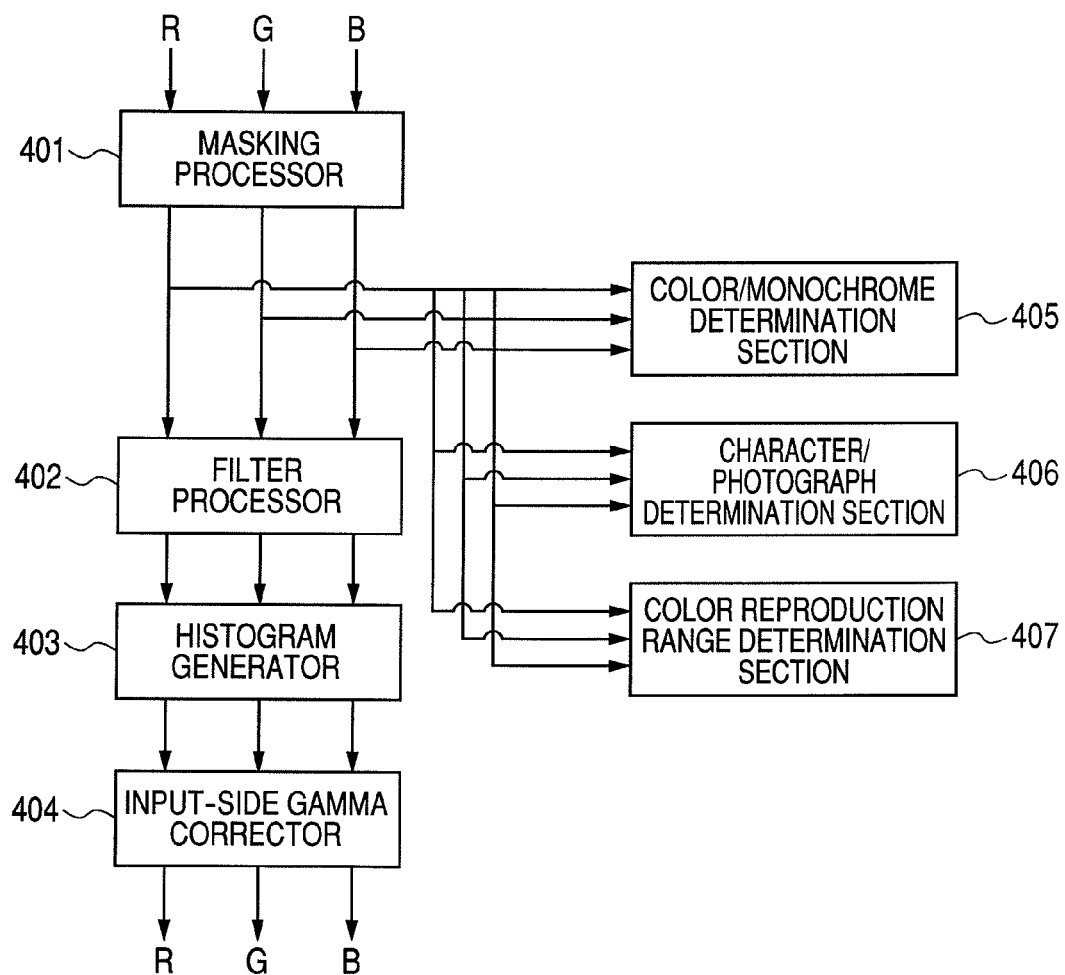
FIG. 4 is a block diagram illustrating an example of the configuration of a scanner image processor 312.

FIG. 4 illustrates an example of the internal configuration of the scanner image processor 312 illustrated in FIG. 3.

The scanner image processor 312 receives image data comprised of 8-bit RGB brightness signals. A masking processor 401 converts each of the brightness signals into a standard brightness signal independent of filter colors of a CCD.

A filter processor 402 arbitrarily corrects the spatial frequency of received image data. The processor carries out an operation, for example, using a 7×7 matrix on the received image data. In a copier, the user can operate the operation section 205 to select, as a copy mode, a character mode, a photograph mode, and a character/photograph mode. When the user selects the character mode, the filter processor 402 applies a character filter to the entire image data. When the user selects the photograph mode, the filter processor 402 applies a photograph filter to the entire image data. When the user selects the character/photograph mode, a filter is switched for each pixel according to a character/photograph determination signal (part of attribute data), which will be described later. That is, it is determined whether the photograph filter or the character filter is applied for each pixel. The photograph filter has a coefficient set to smooth only high frequency components in order to reduce graininess of an image. On the other hand, the character filter has a coefficient set to enhance edges in a relatively strong manner in order to sharpen characters.

A histogram generator 403 performs sampling to produce brightness data of the pixels that form received image data. More specifically, brightness data in a rectangular area defined by start and end points specified in the primary and secondary scan directions is sampled at fixed intervals in the primary and secondary scan directions. A histogram data is then generated based on the sampling result. The generated histogram data is used, when background skip is performed, to estimate the background. An input-side gamma corrector 404 converts the histogram data into nonlinear brightness data, for example, using a table.

A color/monochrome determination section 405 determines whether each of the pixels that form received image data has a chromatic color or an achromatic color, and imparts the determination results to the image data as color/monochrome determination signals (part of attribute data).

A character/photograph determination section 406 determines whether each of the pixels that form the image data forms a character, a halftone dot, a character on halftone dots, or a solid image based on the pixel value of each pixel and the pixel values of surrounding pixels around the pixel. A pixel that belongs to none of the above pixels forms a white area. The determination results are then imparted to image data as character/photograph determination signals (part of attribute data).

A color reproduction range determination section 407 determines a color range of received image data, and acquires a color reproduction range specified in a transfer job based on color reproduction range information for each device returned therefrom.

(Detailed Description of the Printer Image Processor 315)

Figure 5:
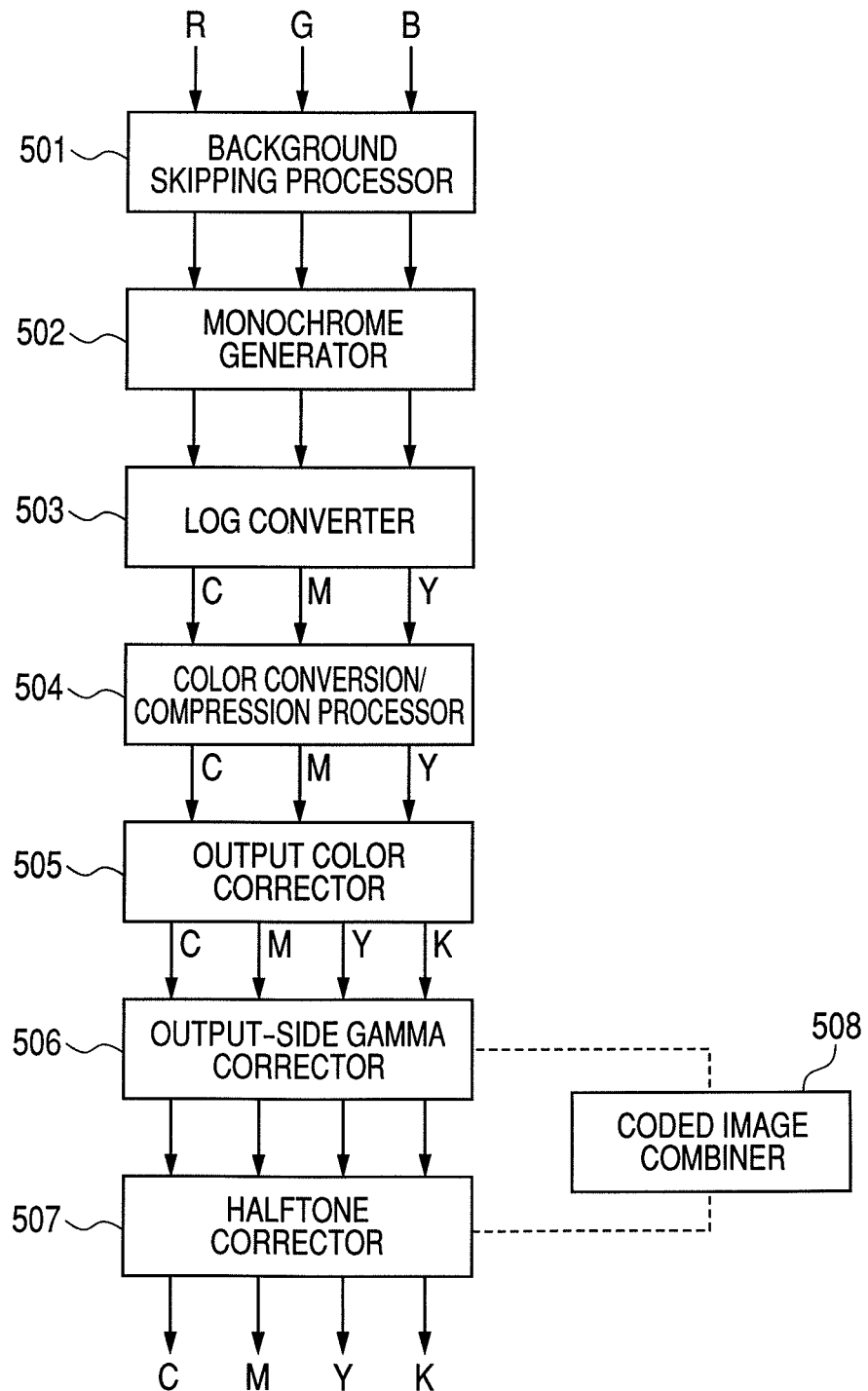
FIG. 5 is a block diagram illustrating an example of the configuration of a printer image processor 315.

FIG. 5 illustrates an example of the internal configuration of the printer image processor 315 illustrated in FIG. 3.

A background skipping processor 501 uses the histogram generated in the scanner image processor 312 to skip a background color of image data. A monochrome generator 502 converts color data into monochrome data. A Log converter 503 performs brightness/density conversion. The Log converter 503 converts, for example, RGB input image data into CMY image data. A color conversion/compression processor 504 responds to a query of the color reproduction range from any of other devices and produces a compression table from colorimetric information to determine the color reproduction range. The color conversion/compression processor 504 also performs data compression according to a specified color reproduction range from any of other devices until the data compression is performed across the specified range. An output color corrector 505 performs output color correction. For example, CMY input image data is converted into CMYK image data by using one of a table and a matrix. An output-side gamma corrector 506 performs correction in such a way that a signal value input to the output-side gamma corrector 506 is proportional to a reflection density value after a copy output process. A coded image combiner 508 uses image data produced by a meta-information image generator (not illustrated) to combine the image data with meta-information embedded copy-forgery-inhibited pattern image data produced in a copy-forgery-inhibited pattern image processor (not illustrated). A halftone corrector 507 performs halftone processing according to the number of grayscales in the output printer. For example, the halftone corrector 507 converts received image data having a large number of grayscales into binary image data, 32-value image data, or image data having other number of values.

The scanner image processor 312 and the printer image processor 315 can also output received image data as it is. Thus forwarding data as it is through a certain processor is hereinafter referred to as "forward data through a processor."

(General Description of the Software Configuration)

A description will be made of the configuration of software (program modules) stored in the HDD 304 in the video controller 201, loaded to the memory (RAM) 302, and executed by the CPU 301.

Figure 6:
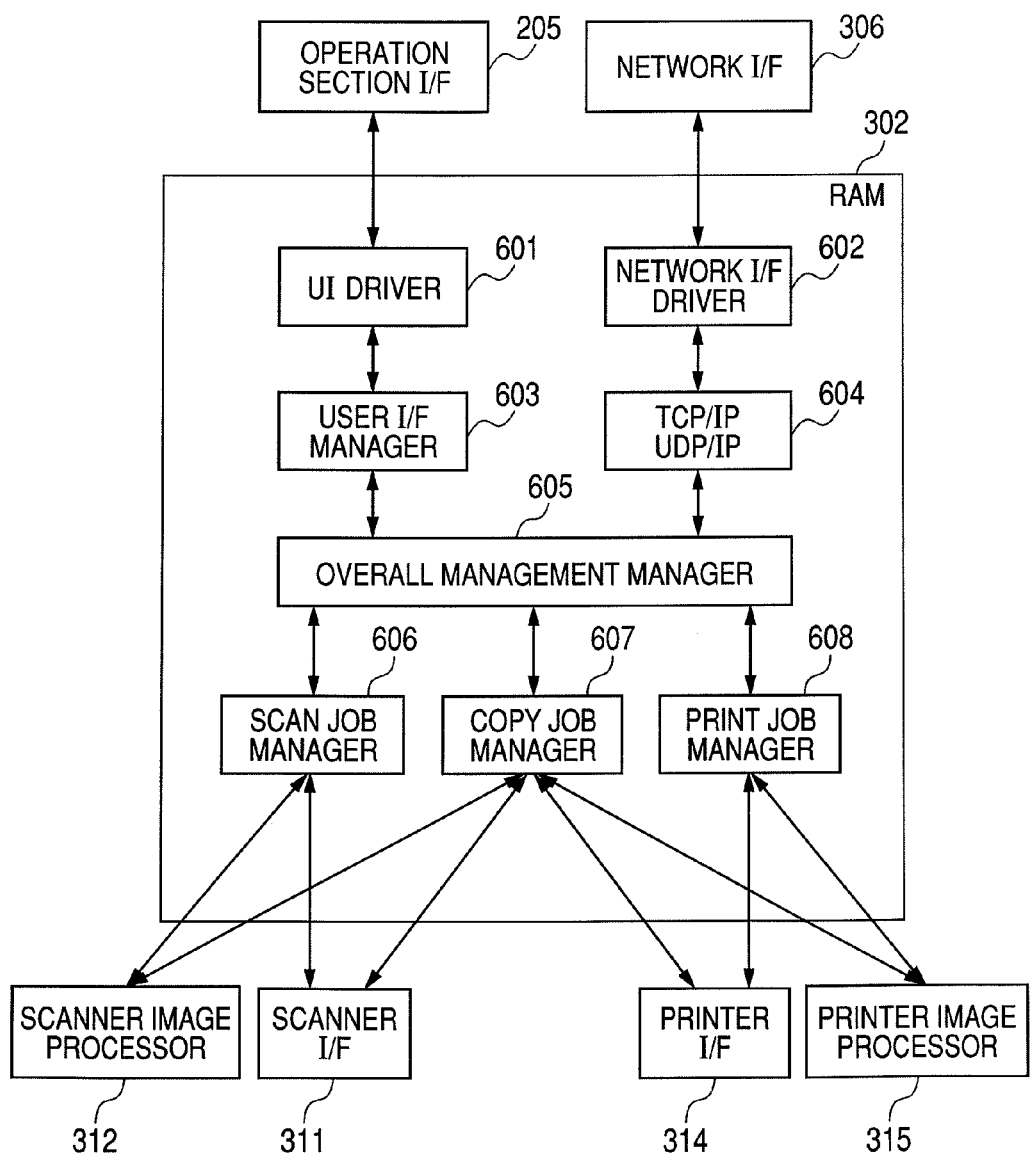
FIG. 6 illustrates an example of the configuration of software.

FIG. 6 illustrates an example of the software configuration in the present embodiment. In FIG. 6, a UI driver 601 controls the operation section 205 illustrated in FIG. 6. A user I/F manager (control program) 603 acquires input information input by the user through the keyboard of the operation section 205 via the UI driver 601 and delivers the input information to an overall management manager (supervisor) 605 that carries out overall management of the action of the video controller 201. The user I/F manager 603 also acquires processing results obtained in the video controller 201 via the overall management manager 605 and instructs the operation section 205 to display the processing results on the LCD display.

FIG. 6 also illustrates a network I/F driver (control program) 602.

The network I/F driver 602 controls the network I/F 306 to process a physical layer (physical packet) in the network, that is, extract a transport packet from a physical packet and produce a physical packet from a transport packet.

A TCP/IP and UDP/IP communication module 604 delivers the transport packet information output from the network I/F driver 602 to the overall management manager 605. The TCP/IP and UDP/IP 604 also produces a transport packet from the information from the overall management manager 605 and outputs the transport packet to the network 206 via the network I/F driver 602.

The overall management manager 605 (Supervisor) performs overall management of the action of the video controller 201 and holds identification information and other data (attribute table) of the apparatus in the HDD 304. The overall management manager 605, for example, refers to processing performance and other data held in a scan job manager 606, a copy job manager 607, and a print job manager 608, instructs the managers to change their processing performance and other data, and distributes jobs (print job, copy job, scan job).

The print job manager 608 manages printer resources and controls job execution. The printer image processor 315 performs image processing on an output image in response to a request from the print job manager 608. The print job manager 608 also communicates with a printer controller (not illustrated) that operates the printer via the printer I/F 314 for printer control. The copy job manager 607 manages copy resources and copy jobs. The scanner job manager 606 manages scanner resources and controls job execution. The scanner image processor 312 performs image processing on an input image in response to a request from the scanner job manager 606. Further, the scan job manager 606 communicates with a scanner controller (not illustrated) that operates the scanner via the scanner I/F 311 for scanner control.

(Description of an Image Reader in a Typical Multifunction Peripheral)

A description will be made of an example of a reduction optical system as the configuration of an image reader in a typical image processing apparatus with reference to (a), (b) and (c) of FIG. 7.

In a typical high-performance reader, a reduction optical system is often used to keep the reading speed, the reading resolution, the image quality of read image data, and other performance.

A device used in a reading portion of the reduction optical system is a CCD (Charge Coupled Device) in many cases.

(a) of FIG. 7 illustrates the configuration of an image reader using a reduction optical system.

(a) of FIG. 7 illustrates a body 701 of the reader, and an ADF (Auto Document Feeder) 702 that holds down an original document 703 and feeds the original document to an original document reading position when the original document scanned.

(a) of FIG. 7 also illustrates a glass platen 704 on which the original document 703 is placed for reading of an original document image on the original document, and a unit 705 including a reading device that reads the original document image, that is, a device that images the original document image.

A light source 706 is typically a xenon lamp or other white-light sources. Mirrors 707 to 711 serve to reflect the light that is emitted from the light source 706 and illuminates the original document image, and deliver the reflected light to an imaging device.

A lens 712 focuses the light coming from the original document image and reflected off the mirror 711 to match the size of the light with the width of the imaging device.

The imaging device 713 is comprised of a CCD in a reduction optical system.

The process of reading an original document image in the reduction optical system will now be described. The light that is emitted from the light source 706 and illuminates the original document image 703 is reflected off the original document image placed on the glass platen 704 and received by the mirror 707. The intensity of the light reflected off the mirror 707 depends on the original document image, and the brighter the original document image, the higher the light intensity.

That is, when the color of the original document image is white, which has a high reflectance, the light intensity is most intense. The light received by the mirror 707 is sequentially reflected off the mirror 708, the mirror 709, the mirror 710, and the mirror 711, and then output to the lens 712.

The lens 712 focuses and outputs the light reflected off the mirror 711 in such a way that the focused light matches the width of the imaging device 713.

A reduction optical system is characterized by the configuration in which the light reflected off an original document image is reflected off a plurality of mirrors, focused by a lens in the final stage, and input to an imaging device.

In a reader using a reduction optical system, the reason why a plurality of mirrors is used to reflect the light is that an optical path having a certain length is necessary to match the size of the light with the width of a CCD.

For example, an optical path necessary to focus optical data of an original document image onto a CCD having a width of 50 mm is at least approximately 200 mm in length.

A reduction optical system thus requires an optical path length according to the size of the imaging device, but the reduction optical system has excellent reading characteristics.

Specifically, even when the original document image 703 is not perfectly in contact with the glass platen 704, the original document image can be read sharply. The distance necessary to achieve a sharp focus is called the depth of field. Even when the original document image 703 is not perfectly in contact with the glass platen 704, a greater depth of field prevents problems in reading the original document image from occurring to some extent.

(b) and (c) of FIG. 7 show an example of the configuration of the imaging device 713, that is, a CCD device.

(b) of FIG. 7 illustrates an example of a three-line sensor with the primary and secondary scan directions being the horizontal and vertical directions, respectively. In (b) of FIG. 7, line sensors 713*a*, 713*b*, and 713*c* read three color signals that form a color image, and each of the lines sensors can read line data formed of H pixels in the primary scan direction.

The line sensors that read the color signals contain pixel sensors 713*d*, 713*e*, and 713*f*. The pixel sensors are successively arranged in the horizontal direction for each of the color signals to be read.

The reading resolution of the CCD device depends on the number of pixel sensors arranged for each of the color signals. That is, a larger number of pixels H allow image data to be read at a higher resolution.

For example, when a CCD has a reading resolution of 600 dpi, the distance between adjacent pixel sensors is determined based on the resolution of 600 dpi.

The reading resolution, that is, the number of pixel sensors directly affects the unit price of a CCD.

That is, to read image data at a high resolution, a reader must use a CCD having a large number of pixel sensors even when such a CCD is expensive in unit price.

A CCD device is further characterized in that line sensors that read color signals are spaced apart.

For example, assume that the line sensor 713*a* includes a filter used to read red (hereinafter referred to as R) image data. Also assume that the line sensor 713*b* includes a filter used to read green (hereinafter referred to as G) image data.

In this case, there is a physical distance between the line sensor 713*a* and the line sensor 713*b* implemented as sensors in the imaging device.

Let L (pixels) be the distance described above. There is a shift between R image data and G image data read at the same timing, the shift corresponding to L pixels in the secondary scan direction.

Similarly, when the line sensor 713*c* includes a filter used to read blue (hereinafter referred to as B) image data, there is a shift between G image data and B image data read at the same timing, the shift corresponding to L (pixels).

The shift between the R image data and the B image data corresponds to 2 L (pixels).

The distance L between line sensors that read color signals affects the configuration of the image processor in which image data read by the reader is processed.

Typical image processing is not carried out for each of line sensors that read RGB color signals but carried out on a pixel basis.

That is, it is necessary to prepare image data in which the distances L between RGB colors are corrected. It is therefore necessary to increase the memory capacity required for the correction as the distance L increases. Further, a mechanical shift generated when the reading device unit 705 is in operation does not disadvantageously allow the distance L between line sensors to be a fixed value. The shift causes color shift when read image data is used to form an image, and directly causes degradation in output image.

To avoid the above problem, the interline distance L in a CCD used in a high-performance multifunction peripheral is set to a significantly small value corresponding to approximately two lines (pixels).

Next, a four-line-sensor CCD will be described below. (c) of FIG. 7 illustrates the configuration of a four-line sensor, again with the primary and secondary scan directions being the horizontal and vertical directions, respectively.

In (c) of FIG. 7, line sensors 713*g*, 713*h*, and 713*i* read three color signals that form a color image, and each of the lines sensors can read line data formed of H pixels in the primary scan direction.

The line sensors that read the color signals contain pixel sensors 713*k*, 7131, and 713*m*. The pixel sensors are successively arranged in the horizontal direction for each of the color signals to be read.

A line sensor 713*j* reads monochrome image data and can read line data formed of H pixels arranged in the primary scan direction, as in the line sensors that read a color image. Pixel sensors 713*n* read a monochrome image, and are successively arranged in the horizontal direction.

The four-line sensor differs from the three-line sensor in that sensors used to read a color image differ from those used to read a monochrome image, but the basic operation of the four-line sensor is the same as that of the three-line sensor.

For example, assume that the line sensor 713*g* includes a filter used to read R image data.

Similarly, assume that the line sensor 713h includes a filter used to read G image data, and the line sensor 713i includes a filter used to read B image data.

In this case, when a color image is read, the line sensors 713g, 713h, and 713i are used to read an original document image.

Since there is the interline distance L between line sensors, the image processor requires, after the image reading stage, a memory for correcting the interline distance to generate image data on a pixel basis.

When a monochrome original document is read, the line sensor 713j, which is not used to read a color image as described above, is used to read the original document image.

In this case, since the line sensor 713j is not related to the other line sensors, the read image data does not undergo interline correction but is handled by the image processor after the image reading stage.

In the four-line sensor, as in the three-line sensor, the reading resolution of the CCD device depends on the number of pixel sensors arranged for each color signal. That is, a larger number of pixels H allow image data to be read at a higher resolution.

Further, the reading resolution, that is, the number of pixel sensors directly affects the unit price of a CCD, as in the three-line sensor. That is, to read image data at a high resolution, a reader must use a CCD having a large number of pixel sensors even when such a CCD is expensive in unit price.

As described above, a reader in a typical multifunction peripheral employs one of the reduction optical system described above and a contact-type optical system.

The fact that the reading resolution depends on the number of pixel sensors arranged in the primary scan direction is common to a reduction optical system and a contact-type optical system. On the other hand, there is a technology called super-resolution processing.

In the super-resolution technology, multiple sets of image data read at the resolution of a sensor in a reader are used to significantly improve the original resolution of the image data.

(Super-resolution Processing)

The super-resolution processing technology will be described with reference to (a), (b) and (c) of FIGS. 8 to 12.

(a) of FIG. 8 illustrates image data to be read by a reader. (b) of FIG. 8 illustrates the pixel configuration when the image data is read, for example, at a resolution of 1200 dpi.

In (b) of FIG. 8, the grid labeled with reference numeral 801 represents pixel data at the resolution used when the image data is read.

That is, the distance n between pixels corresponds to the distance between adjacent pixel sensors when the image data is read at a resolution of 1200 dpi.

(c) of FIG. 8 illustrates the pixel configuration when the reader reads an image having the same image size at a resolution of 300 dpi. In (c) of FIG. 8, as in (b) of FIG. 8, the grid labeled with reference numeral 802 represents pixel data at the resolution used when the image data is read.

Therefore, with reference to the distance n between pixels at a resolution of 1200 dpi, the distance between pixels is as coarse as 4 n when the image is read at a resolution of 300 dpi.

Since the reproducibility of an image that has been read is proportional to the resolution, a direct comparison between the image data read at a resolution of 1200 dpi ((b) of FIG. 8) and the image data read at a resolution of 300 dpi ((c) of FIG. 8) shows that the difference in image quality is significant.

In the super-resolution technology, multiple sets of image data equivalent to that illustrated in (c) of FIG. 8 are used to generate the image data illustrated in (b) of FIG. 8.

Using such a technology allows formation of an image comparable to that read by a high-resolution device even when the original resolution of a reading device is not high.

However, to carry out "super-resolution conversion" to convert low-resolution image data into one of high-resolution image data and super-resolution image data, a certain condition should be satisfied.

According to a certain condition, it is necessary to prepare original document image data corresponding to a plurality of frames obtained by minutely shifting the positions to be read in the primary scan direction and/or the secondary scan direction with reference to original document image data read at the resolution of the sensor of the reader.

That is, it is necessary to prepare successive sets of image data corresponding to a plurality of frames obtained by slightly shifting the position of the original document image to be read by the sensor in the primary scan direction and/or the secondary scan direction from the reference image data.

Further, when the image data corresponding to multiple screens (frames) is read, the shift in original document image reading position present between two sets of image data obtained by adjacent sensors needs to be smaller than a single pixel (sub-pixel) in the primary scan direction and/or the secondary scan direction.

In the following description, image data corresponding to a single screen (frame) is referred to as "frame image data." Further, the position where an original document image is read is referred to as "phase." The situation in which the phase is shifted is referred to as "the phase is shifted," and the shift in the position where an original document image is read is referred to as "the shift in phase."

The low resolution used herein is not limited to 300 dpi, but refers to the resolution of an image output from the apparatus in a normal printing process. The primary scan direction used herein is the direction perpendicular to the direction in which, when an original document image placed on the platen is read by the scanner, the unit 105 moves relative to the original document image. As indicated by the arrow A in (a) of FIG. 8, the transverse direction of the read original document image is referred to as the "primary scan direction." Similarly, the secondary scan direction is the direction parallel to the direction in which the unit 105 moves. The primary scan direction used herein is the direction perpendicular to the direction in which, when an original document image placed on the platen is read by the scanner, the unit 105 moves relative to the original document image. As indicated by the arrow B in (a) of FIG. 8, the longitudinal direction of the read original document image is referred to as the "secondary scan direction."

It is of course possible to achieve high resolution even when there is a shift in phase only in one of the primary scan direction and the secondary scan direction.

In this case, however, high resolution is achieved only in the direction in which there is a shift in phase.

The condition necessary for the super-resolution processing will be described with reference to (a), (b), (c), (d), (e) and (f) of FIG. 9 and the following figures. (a) of FIG. 9 illustrates the pixel configuration when the original document image illustrated in (a) of FIG. 8 is read at a resolution of 300 dpi. (a) of FIG. 9 is the same as (a) of FIG. 8 illustrating the original document image.

The read image data illustrated in (b) of FIG. 9 is target image data in the first frame in the super-resolution processing, and is also reference image data.

Thereafter, as illustrated in (c) of FIG. 9, the original document image illustrated in (b) of FIG. 9 is read at a resolution of 300 dpi with the phase of the reference image data shifted by Δx (Δx<4 n) in the primary scan direction and by Δy (Δy<4 n) in the secondary scan direction.

In this case, the phase of the read image data illustrated in (d) of FIG. 9 differs from the phase of the original document image and is shifted by Δx in the primary scan direction and by Δy in the secondary scan direction as illustrated in the figure.

The read image data illustrated in (d) of FIG. 9 is target image data in the second frame in the super-resolution processing.

Further, as illustrated in (e) of FIG. 9, the original document image illustrated in (a) of FIG. 9 is read at a resolution of 300 dpi with the phase of the reference image data shifted by Δx' (Δx'<4 n, Δx<Δx') in the primary scan direction and by Δy' (Δy'<4 n, Δy<Δy') in the secondary scan direction.

In this case, the phase of the read image data illustrated in (f) of FIG. 9 differs from the phase of the original document image and is shifted by Δx' in the primary scan direction and by Δy' in the secondary scan direction as illustrated in the figure.

The read image data illustrated in (f) of FIG. 9 is a target image in the third frame in the super-resolution processing.

High resolution is achieved by acquiring read low-resolution image data corresponding to a plurality of frames shifted from one another in terms of phase relative to the reference image data along with super-resolution processing.

(a), (b), (c) and (d) of FIG. 10 conceptually illustrates how low-resolution image data corresponding to three frames is used to form high-resolution image data.

(a), (b), (c) and (d) of FIG. 10 illustrates that the super-resolution processing is applied to reference image data illustrated in (a) of FIG. 10 and low-resolution image data illustrated in (b) of FIG. 10, (c) of FIG. 10, . . . corresponding to a plurality of frames shifted from one another in terms of phase to provide image data illustrated in (d) of FIG. 10.

The super-resolution processing performed in this case will be described in more detail with reference to FIGS. 11 and 12.

FIG. 11 illustrates low-resolution image data to be used in the super-resolution processing and image data that has undergone the super-resolution processing. FIG. 11 illustrates an original document image, reference low-resolution image data F0 obtained by reading the original document image by an area sensor, and target low-resolution image data F1 to F3. Each dotted-line rectangle that surrounds the original document image indicates the area when the reference low-resolution image data F0 is read by the area sensor, and the solid-line rectangles indicate the areas when the target low-resolution image data F1 to F3 is read by the area sensor.

In the present embodiment, the offset amount in the primary scan direction is expressed by "um," and the offset amount in the secondary scan direction is expressed by "vm." The amounts of shift described above for the target low-resolution image data Fn (n=1 to 3) are expressed by "umn" and "vmn." For example, as illustrated in FIG. 11, the target low-resolution image data F1 is shifted in the secondary scan direction relative to the reference low-resolution image data F0, and the amounts of shift are expressed as um1 and vm1. Similarly, the amounts of shift for the target low-resolution image data F2 and F3 are expressed as um2, vm2 and um3, vm3.

The amounts of shift umn and vmn for each target low-resolution image data Fn (n=1 to 3) are calculated based on the reference low-resolution image data F0 and the target low-resolution image data F1 to F3. The calculation is carried out based on inclination information of the area sensor pre-stored in the ROM 203. FIG. 11 diagrammatically illustrates that each target low-resolution image data is shifted by a single unit pixel in the present embodiment. In the reading using an area sensor in the present embodiment, however, there is a shift in phase smaller than a single pixel in the primary and secondary scan directions. Using such a minute shift allows an image to be converted into a high-resolution image as described above.

Therefore, among the pixels that form generated super-resolution image data (hereinafter referred to as "generated pixels"), there is a pixel that does not belong to none of the reference low-resolution image data and the target low-resolution image data.

Such a pixel is converted into a high-resolution pixel by using image data representing pixel values of the pixels that surround the generated pixel to perform predetermined interpolation processing and combination. Examples of the interpolation processing may include a bi-linear method, a bi-cubic method, and a nearest neighbor method.

For example, interpolation processing using a bi-linear method will be described with reference to FIG. 12. First, a nearest pixel 1802 closest to the position (x, y) of a generated pixel 1801 is extracted from the reference low-resolution image data and the target low-resolution image data. From the target low-resolution image data illustrated in FIG. 12, four pixels that surround the generated pixel position are determined as surrounding pixels 1802 to 1805. The data values of the surrounding pixels are weighted by predetermined weights and then averaged to provide the data value of the generated pixel by using the following formula.

$$f(x, y)=[|x1-x|\{|y1-y|f(x0, y0)+|y-y0|f(x0, y1)\}+|x-x0|\{|y1-y|f(x, y0)+|y-y0|f(x1, y1)\}]/|x1-x0||y1-y0|$$

Repeating the above processes for each generated pixel position allows formation of a super-resolution image with the resolution doubled illustrated in FIG. 11. The resolution is not necessarily doubled, but may be multiplied by a variety of factors. Using a number of data values of low-resolution image data in the interpolation processing allows formation of a more resolved super-resolution image.

(How to Use Area Sensor)

FIG. 1 illustrates an example of the reader in a multifunction peripheral to which the present embodiment is applied.

FIG. 1 illustrates a body 101 of the reader and an ADF 102 that holds down an original document 103 and feeds the original document to an original document reading position when the original document is scanned.

FIG. 1 also illustrates a glass platen 104 on which the original document 103 is placed for reading of an original document image on the original document.

A unit 105 includes a reading device that reads the original document image 103, that is, a device that images the original document image.

A light source 106 is a xenon lamp or other white-light sources.

Mirrors 107 to 111 serve to reflect the light that is emitted from the light source 106 and illuminates the original document image, and deliver the reflected light to the imaging device.

A lens 112 focuses the light originated from the original document image and reflected off the mirror 111 to match the size of the light with the width of the imaging device.

The imaging device 113 is comprised of an area sensor in the apparatus used in the present embodiment. An area sensor is an imaging device used in a digital camera and other types of cameras. An area sensor differs from the sensor on a line basis described above in that pixel sensors that read an original document image are arranged two-dimensionally.

FIG. 13 illustrates the configuration of an area sensor. FIG. 13 illustrates an area sensor device 1301.

There are pixel sensors 1302 in the area sensor 1301. The area sensor 1301 is comprised of pixel sensors for H pixels in the long-side direction and pixel sensors for L pixels in the short-side direction.

The pixel sensor in a single pixel may be equally divided into four to form RGB color pixel sensors.

Further, the number of H pixels may be equal to the number of L pixels (the longer side is equal to the shorter side in length). The resolution of the area sensor is determined by the distance N between pixel sensors.

An area sensor used in a high-resolution digital camera is comprised of a significantly large number of pixels as the number of pixel sensors in the long-side direction and the number of pixel sensors in the short-side direction. For example, some ten-million-pixel-sized digital cameras have 3,800 pixels as the pixel sensors in the long-side direction and 2,800 pixels as the pixel sensors in the short-side direction.

In general, when an area sensor is used in a camera or any other similar apparatus, the area sensor captures input image data as a two-dimensional area and picks up an image. That is, in a single imaging action, two-dimensionally arranged pixel sensors are used to pick up an image. When an area sensor device is fixed in the reader, the pixel sensors are disposed in such a way that the pixel sensors are not inclined to convert picked-up image data into an image without distortion in the transverse and longitudinal directions.

The pixel sensors are therefore disposed in such a way that there is no diagonal misalignment when the picked-up image is reproduced. For example, when an area sensor is fixed in a typical camera, image data read by the line pixel sensors indicated by the black frame 1303 forms the uppermost end of the imaged object. In this case, the read image data is not inclined to the direction in which the line is formed.

Similarly, image data read by the line pixel sensors indicated by the black frame 1304 is image data in a position different from the position of the imaged object read by the pixel sensors in the frame 1303, that is, in a position below the frame 1303 in the vertical direction. The frame 1305 therefore corresponds to the image data in the position four steps below the imaging position read by the pixel sensors in the frame 1303 in the vertical direction.

As described above, when an area sensor is used in a digital camera, the pixel sensors that form the area sensor pick up images in respective different positions of the imaged object because image data is picked up in the form of a two-dimensional area.

How to use an area sensor in the apparatus used in the present embodiment, however, differs from how to use an area sensor in a digital camera described above. First, the area sensor illustrated in FIG. 13 is attached in a reference installation position in the reader.

In an image processing apparatus that carries out printing in a typical manner, when an original document is placed at a specified position on the platen 104 in FIG. 1, the light emitted from the light source, which translates under the original document image in the same direction as the longitudinal direction of the original document image, is directed toward the original document image, reflected off the original document image, and focused onto the sensor. The sensor captures the reflected light that is not inclined to the sensor. The reflected light as one-line image data obtained by translating the light source is focused parallel to the transverse direction (long-side direction) of the sensor illustrated in FIG. 13.

To this end, the sensor is disposed in a position where the sensor can capture the original document image with almost no inclination. The position where the sensor is disposed to achieve such an output of the original document image is referred to as "reference installation position."

In the following description, it is assumed, to simplify the description, that the sensor is comprised of 20 pixel sensors in the long-side direction and 10 pixel sensors in the short-side direction. The sensor may of course be structured in such a way that the length in the long-side direction is equal to the length in the short-side direction. It is noted that the number of pixel sensors described above is intended to describe the use and configuration of the area sensor in the present embodiment, and should not be limited to the number of illustrated pixel sensors.

In practice, the area sensor may of course be adapted by using the number of pixel sensors used in a digital camera. The reading unit 105 including the area sensor 113 fixed in the reader is moved in the direction indicated by the arrow illustrated in FIG. 1 to read the original document image 103 placed on the platen 104. That is, the reading line sensors 1304 and 1305, each of which is a set of pixel sensors, are used as the line sensors to carry out reading as described above.

How to process image data read by the reading line sensors 1304 and 1305 will be described below. FIG. 14 illustrates an image to be read in the following description. That is, the image corresponds to the original document image 103 illustrated in FIG. 1.

The grid illustrated in FIG. 14 corresponds to the resolution of the pixel sensors that form one of the reading line sensors 1304 and 1305.

When the reading unit 105 is driven to move under the platen in the secondary scan direction, the reading line sensors 1304 and 1305 sequentially read image data input thereto.

That is, the portion of the original document image that corresponds to the line width in the position of the reading unit 105 is successively read. The process of reading the original document image will be described.

When the reading unit 105 moves under the platen in the secondary scan direction, the light from the light source impinges on the hatched portion of the original document image illustrated in (a) of FIG. 15, (a) of FIG. 16, (a) of FIG. 17, and (a) of FIG. 18.

First, at a certain instant, the light from the light source impinges on the hatched portion in (a) of FIG. 15. The area sensor then senses the light and detects the portion of the original document image that corresponds to the line width, which is the portion on which the light has impinged.

For example, at this point, the line sensor 1304 detects image data illustrated in (b) of FIG. 15. At the same time, the line sensor 1305 detects image data illustrated in (c) of FIG. 15.

There is a shift in reading position between the two image data because the two line sensors are physically spaced apart from each other.

The thus read original document image is handled as image data different from one another read by the respective reading line sensors, and the resultant image data are separately stored in memories or other storage media illustrated in (d) and (e) of FIG. 15.

When the sensor unit 105 then moves and hence the light source moves, the position where each line sensor detects the original document image changes, as illustrated in (a) of FIG.

16. The line sensor 1304 then detects image data illustrated in (b) of FIG. 16, and the line sensor 1305 detects image data illustrated in (c) of FIG. 16.

The thus read original document image is handled as image data different between the reading line sensors, and the resultant image data are separately stored in memories or other storage media illustrated in (d) and (e) of FIG. 16.

Similarly, when the portion in the position illustrated in (a) of FIG. 17 is read, the image data illustrated in (b) and (c) of FIG. 17 are stored in memories or other storage media illustrated in (d) and (e) of FIG. 17.

Further, when the portion in the position illustrated in (a) of FIG. 18 is read, the image data illustrated in (b) and (c) of FIG. 18 are stored in memories or other storage media illustrated in (d) and (e) of FIG. 18.

Finally, all the portions of the original document image are illuminated with the light from the light source, and the line sensors in the respective positions read image data.

The thus read image data are sequentially stored in the memories, and frame image data corresponding to a plurality of frames are acquired as illustrated in (a) and (b) of FIG. 19, the two sets of image data shifted by a single pixel in the secondary scan direction.

Each set of the frame image data shifted in the secondary scan direction is comprised of subsets of image data corresponding to the number of line sensors, each of which being comprised of a set of pixel sensors.

Thus using an area sensor in which pixel sensors are arranged two-dimensionally to read an image allows frame image data corresponding to a plurality of frames the phase of which is successively shifted in the secondary scan direction to be obtained in a single reading action.

How to use the area sensor described above in the apparatus used in the present embodiment will be described below.

First, the area sensor illustrated in FIG. 13 is fixed in an inclined position in the reader.

(a) of FIG. 20 illustrates an example of how the area sensor is fixed in the present embodiment. (a) of FIG. 20 illustrates an area sensor device 2001 and pixel sensors 2002. In the following description, it is assumed that the area sensor device is comprised of 20 pixel sensors in the long-side direction and 10 pixel sensors in the short-side direction.

The area sensor is inclined to the reference installation position and then fixed. That is, when the area sensor is fixed in the reference installation position as illustrated in (a) of FIG. 20, the lowermost line sensor in the area sensor and the reference installation position forms an angle θ.

The position of each of the constituent pixel sensors is expressed in a coordinate system defined by the origin being the upper left point of the area sensor, the x direction being the long-side direction, and the y direction being the short-side direction. That is, the coordinates of the upper left point (x, y) is (0, 0), and the coordinates of the upper right point (x, y) is (19, 0). Similarly, the coordinates of the lower left point (x, y) is (0, 9), and the coordinates of the lower right point (x, y) is (19, 9).

An area 2003 indicates a set of pixel sensors corresponding to a single line that forms the area sensor 2001. Specifically, the single line is comprised of 20 pixel sensors along the long-side direction.

That is, the single line is comprised of the pixel sensors in the coordinates (0, 4), (1, 4), (2, 4), . . . (19, 4). In the following description, a plurality of pixel sensors in the area 2003 is referred to as a reading line sensor 2003.

Similarly, an area 2004 includes pixel sensors in the coordinates (0, 5), (1, 5), (2, 5), . . . (19, 5), and is referred to as a reading line sensor 2004 in the following description.

In the present embodiment, the reading unit 105 including the area sensor 113 fixed in the reader is moved in the direction indicated by the arrow illustrated in FIG. 1 to read an original document image placed on the platen 104.

That is, the reading line sensors 2003 and 2004, each of which is a set of pixel sensors, are used as the line sensors to carry out reading as described above.

How to process image data read by the reading line sensors 2003 and 2004 will be described below. FIG. 14 illustrates an original document image to be read in the following description. That is, the original document image corresponds to the original document image 103 illustrated in FIG. 1.

The grid illustrated in FIG. 14 corresponds to the resolution of the pixel sensors that form one of the reading line sensors 2003 and 2004. Although the original document image is read in the same manner as illustrated in (a), (b), (c), (d) and (e) of FIGS. 15 to 19 described above, frame image data inclined by the angle θ is obtained because the area sensor is inclined by θ.

For example, when the area sensor is not originally inclined, the position indicated by the hatched portion illustrated in (a) of FIG. 21 should be read. Since the area sensor is inclined, however, the line sensors 2003 and 2004 detect image data inclined as illustrated in (b) and (c) of FIG. 21.

The inclined image data are then stored as they are in memories or other storage media illustrated in (d) and (e) of FIG. 21. Similarly, when the sensor unit 105 moves and hence the light source moves, the position indicated by the hatched portion illustrated in (a) of FIG. 22 is read. In this case, the line sensors 2003 and 2004 detect image data as illustrated in (b) and (c) of FIG. 22.

The image data are then stored in memories or other storage media illustrated in (d) and (e) of FIG. 22. Further, when the reading unit moves in the secondary scan direction and hence the light source moves to read the position indicated by the hatched portion illustrated in (a) of FIG. 23, the line sensors 2003 and 2004 obtain image data illustrated in (b) and (c) of FIG. 23. The image data are then stored in memories or other storage media illustrated in (d) and (e) of FIG. 23.

(a) and (b) of FIG. 24 show frame image data finally detected and read by the line sensors 2003 and 2004. The thus read image data are those inclined by the angle θ. The direction indicated by the arrow (A) in (a) of FIG. 24 is referred to as the primary scan direction, and the direction indicated by the arrow (B) is referred to as the secondary scan direction. On the other hand, the direction indicated by the arrow (C) is referred to as the transverse direction of read image data. The direction indicated by the arrow (D) is referred to as the longitudinal direction of the read image data.

As illustrated in (a) of FIG. 20, the reading line sensors 2003 and 2004 are physically spaced apart from each other in the secondary scan direction by a single pixel. There is therefore a shift in phase in the long-side direction between the pixel sensors that form the reading line sensor 2003 and the pixel sensors that form the reading line sensor 2004.

For example, the pixel sensor in the reading line sensor 2003 that is positioned in the coordinates (x, y)=(15, 4) is shifted from the pixel sensor in the reading line sensor 2004 that is positioned in the coordinates (x, y)=(15, 5) by one unit step (y=1) in the y direction, which is the short-side direction. This shift causes a shift $\Delta\beta$ in the vertical direction in the reference installation position. On the other hand, the positions of the two pixel sensors in the x direction, which is the long-side direction, are the same, which is x=15. The inclination angle θ, however, causes a shift in phase between the two pixel sensors by a minute amount $\Delta\alpha$, which is less than or equal to a sub-pixel, in the horizontal direction in the reference installation position.

That is, when the area sensor is inclined, a minute shift in phase occurs even for pixel sensors in the same position in the x-axis direction, which is the short-side direction, in a reading line sensor. The offset amount depends on the inclination angle. Image data read by reading line sensors defined in the area sensor 113 are therefore frame image data different in terms of shift in phase between the reading line sensors. Specifically, the read image data illustrated in (a) of FIG. 24 and the read image data illustrated in (b) of FIG. 24 are shifted from each other in terms of phase by a single pixel in the transverse direction, that is, not only by Δβ in the secondary scan direction but also by Δα in the primary scan direction.

The above description has been made by assuming that there are two reading line sensors (reading line sensors 2003 and 2004), but the present invention is not limited thereto. The number of pixel sensors that form the area sensor 113 may be increased in the short-side direction to form a large number of reading line sensors. That is, the number of reading line sensors can be increased up to the number of pixels that form the area sensor 113.

The number of thus adapted reading line sensor is equal to the number of frame image data sets obtained in a single reading action. That is, forming reading line sensors corresponding to 30 lines in the area sensor 113 allows frame image data sets corresponding to 30 frames, each of which having its own shift in phase, to be obtained in a single reading action.

When the area sensor is inclined, frame image data sets can be obtained in a single scan action by shifting the position of an original document image to be read by sensors adjacent in the short-side direction by a shift of less than one pixel in the primary and secondary scan directions. Using frame image data obtained by such reading control along with the super-resolution processing therefore allows formation of image data the resolution of which is higher than that of the reading device.

In addition to the sensor arrangement as discussed above, another arrangement is possible as shown in (b) of FIG. 20. As is in the arrangement of (a) of FIG. 20, when the area sensor is inclined, frame image data sets can be obtained in a single scan action by shifting the position of an original document image to be read by sensors adjacent in the short-side direction by a shift of less than one pixel in the primary and secondary scan directions.

Namely, it is sufficient to move the scan position in parallel relative to an original document image in an area sensor comprising a plurality of sensors in order to obtain frame image data sets by shifting the position of the original document image to be read by sensors adjacent in the short-side direction by a shift of less than one pixel in the primary and secondary scan directions. In addition, it is possible to gain more frame image data that can be obtained in the sensor short-side direction by increasing the number of readings of the original document image in the secondary scan direction and increasing the number of samplings per unit time.

Embodiments will be described below based on the configuration described above.

(First Embodiment)

First, the procedure of the present embodiment will be described with reference to FIG. 25. In the procedure, reading pixel sensors diagonally positioned with respect to a reference installation position are used to read an original document image to acquire frame image data corresponding to a plurality of frames different from one another in terms of phase, and the resultant frame image data is used to perform high-resolution processing.

In FIG. 25, upon initiation of an original document image reading process, in the step S2501, the area sensor diagonally positioned with respect to a reference installation position is used to read an original document image.

The original document image reading process is initiated when the user places the original document image on one of the glass platen and the ADF and pushes a start button, as in a typical copy process.

Image data obtained by the diagonally positioned area sensor is low-resolution frame image data read by line sensors formed in the area sensor, as described above.

When the original document image is scanned once, one-frame image data is obtained by each of the line sensors. In the process of reading image data by line sensors adjacent to each other in the short-side direction, it is possible to read frame image data corresponding to a plurality of frames shifted in the primary scan direction by a shift of less than one pixel.

Since the area sensor is inclined by θ, each of the read frame image data sets is also inclined by θ.

In the next step S2502, inclination angle information on the inclined read frame image data that has been read is obtained.

That is, the inclination angle of the area sensor is acquired. The inclination angle θ can be acquired in a process of assembling a multifunction peripheral including the area sensor at the point when the area sensor 113 is fixed in the reading unit 105.

The inclination angle θ is held as a value specific to the area-sensor-fixed apparatus in a storage area in the multifunction peripheral. The angular information is acquired from the storage area in the multifunction peripheral.

In the next step S2503, the angular information is used to perform affine transformation so as to rotate the inclined frame image data that has been acquired. In this process, the frame image data is rotated by the inclination angle. This operation corrects the inclination of the frame image data. Let (X, Y) be the coordinates before the transformation, (X', Y') be the coordinates after the transformation, and θ be the angle of rotation (the inclination angle of the area sensor in the present embodiment). The affine transformation expressed by the Formula 1 is then used to provide inclination-corrected frame image data.

$$[X', Y'] = [X, Y] \begin{bmatrix} \cos\theta & \sin\theta \\ -\sin\theta & \cos\theta \end{bmatrix} \quad \text{(Formula 1)}$$

X', Y': Coordinates after transformation

X, Y: Coordinates before transformation

The frame image data obtained by performing the affine transformation is inclination-corrected low-resolution frame image data.

The method for correcting the inclination is not limited to affine transformation, but may be any other method for correcting the inclination of image data.

In the step S2504, the plurality of inclination-free frame image data is used to perform super-resolution conversion, which is high-resolution conversion in the process described above, and image data the resolution of which is higher than the resolution of the sensor provided in the apparatus is output.

In the step S2505, the resultant image data is printed on a sheet of paper as an output. The inclination may be alternatively corrected after the super-resolution conversion is performed.

(Second Embodiment)

In the first embodiment, the inclination angle θ is acquired from a value that can be acquired when the area sensor 113 is fixed in the reading unit 105 in the process of assembling a multifunction peripheral including the area sensor.

In the present embodiment, the inclination angle is not acquired from existing information stored in the apparatus, but the inclination angle information is acquired by detecting the inclination of the area sensor when the apparatus receives an instruction from the user.

A method for detecting the inclination of the area sensor will be described with reference to FIG. 26, (a) of FIG. 27 and (b) of FIG. 27. The process of determining the inclination of the area sensor in the present embodiment uses a method for acquiring deviation smaller than a single pixel by searching pixel sensors outputting high read density values among the pixel sensors that have read a straight line having a width corresponding to a single pixel in the area sensor and evaluating the density values of the pixels around each of the pixel sensors outputting high read density values.

FIG. 26 illustrates an example of a test chart used to detect the inclination of the fixed area sensor.

A number of straight lines are drawn on the test chart, each of the straight lines having a width corresponding to a single pixel in the area sensor.

The straight lines are drawn parallel to each other on the original document image. When the original document image is read, the original document image is placed on the platen parallel to the secondary scan direction. In this case, a mark or any other similar indication may be provided on the platen so that the reading is carried out with the straight lines being parallel to the secondary scan direction. When the chart is read, and a certain single pixel sensor is looking at a solidly-painted portion (the read density value of the pixel sensor is 100%), each of the pixel sensors on the right and left sides of that pixel sensor (in the long-side direction) should be looking at a portion in which the read density value of the pixel sensor is 0%. It is noted that a read density value greater than a certain threshold value may be considered to be a read density value of 100%, although depending on the performance of the sensor. Similarly, a read density value smaller than a certain threshold value may be considered to be a read density value of 0%.

Thus reading a printed straight line allows the position where the straight line is drawn in the original document image to be readily detected.

When no solidly-painted portion is detected from a pixel sensor, that is, the pixel sensor does not output a read density value of 100%, detecting the read density values of the pixel sensors on the right and left sides of that pixel sensor allows determination of how much a line having a width corresponding to a single pixel is inclined within the same pixel sensor. Now assume that a read density value is proportional to the area of a pixel sensor used to read an original document image (solidly-painted portion).

Based on the above assumption, for example, when a certain pixel sensor outputs a read density value of 50%, half the pixel sensor is looking at a solidly-painted portion, and hence the pixel sensor should be deviated from the straight line on the test chart by half a single pixel.

Similarly, when a certain pixel sensor outputs a read density value of 20%, one-fifth the pixel sensor is looking at a solidly-painted portion, and hence the pixel sensor should be deviated by one-fifth a single pixel.

While it is assumed that the thickness of the straight line on the test chart is equal to the width corresponding to a single pixel for the sake of simplification, the thickness of the line is not necessarily the width corresponding to a single pixel.

Checking the density values of the surrounding pixels around a pixel that reads a straight line allows the position where the straight line is drawn in a single pixel sensor to be detected.

(a) and (b) of FIG. 27 is a diagram illustrating how the diagonally positioned area sensor reads a straight line having a width corresponding to a single pixel and detects the angle of the sensor. In (a) of FIG. 27, a straight line 2701 has a width corresponding to a single pixel and is drawn on a test chart.

Pixel sensors 2702 and 2703 are not adjacent to each other, but arranged on the straight line on the test chart with a few pixel sensors therebetween.

The pixel sensors 2702 and 2703 represent pixel sensors that have read the straight line 2701 having a width corresponding to a single pixel and output a read density value of 100% (or a read density value considered to be 100%).

Now, let A be the center of the pixel sensor 2703, B be the center of the pixel sensor 2702, and θ be the inclination of the area sensor.

Considering the distance between A and B, in (a) of FIG. 27, since the distance in the long-side direction corresponds to a single pixel and the distance in the short-side direction corresponds to four pixels, X=N and Y=4L.

In (a) of FIG. 27, since each of the pixel sensors is drawn as a circle, N=L, but other definitions are made for pixel sensors that are not circular. The distance between pixel sensors is expressed by N.

When each of the pixel sensors 2702 and 2703 outputs a read density value of 100% as illustrated in (a) of FIG. 27, the distance between the pixel sensors can be used to calculate the angle of the sensor by using the following formula.

$$\theta = \arctan(X/Y)$$

$$X = N$$

$$Y = 4L$$

Instead of detecting two or more sensors outputting a read density value of 100% on the straight line 2701 on the test chart, sensors outputting read density values that are considered to be the same density value may be detected.

Now, consider a case different from the case illustrated in (a) of FIG. 27. That is, as illustrated in (b) of FIG. 27, assume that neither of two pixel sensors can output a read density value of 100% when reading a straight line having a width corresponding to a single pixel.

Alternatively, assume that two pixel sensors cannot output a read density value considered to be the same when reading a straight line having a width corresponding to a single pixel. In this case, two pixel sensors that read a straight line having a width corresponding to a single pixel and output substantially the same read density values may be detected. A straight line 2704 has a width corresponding to a single pixel.

A pixel sensor 2705 represents a pixel sensor that has read a straight line having a width corresponding to a single pixel and output a read density value of 100%.

The pixel sensor 2705 illustrated in FIG. 27(b) reads the straight line 2704 and outputs a read density value of 100%. However, a pixel sensor 2706 positioned on the straight line 2704 read by the pixel sensor 2705 does not output a read density value of 100% when reading the straight line 2704.

Now, let A be the center of the pixel sensor 2706, and B' be the intersection of the line extending from the pixel sensor 2706 toward the pixel sensor 2705 in the vertical direction, that is, the direction in which the straight line 2704 extends, and the line passing through the center of the pixel sensor 2705 and extending in the long-side direction.

Let a be the length between the center of the pixel sensor 2705 and B', and θ' be the inclination of the area sensor.

As described above, since the read density value of a sensor is proportional to the area of the sensor used to read an image, "the amount of deviation α" is also proportional to the read density value of the sensor.

For example, when the read density value is 100%, α=0. When the read density value is 90%, α=0.1N. When the read density value is 10%, α=0.9N.

In this case, when the deviation is smaller than a single pixel, the calculation can be carried out by using the following formulas in consideration of the distance between the two pixel sensors and the amount of deviation α in the long-side direction.

$$\theta' = \arctan(X/Y)$$

$$X = N + \alpha$$

$$Y = 4L$$

The inclination angle of the area sensor can be thus determined. As illustrated in (a) and (b) of FIG. 27, the inclination of the area sensor can be calculated by detecting the read density values of two or more pixel sensors located on a straight line or in the vicinity of a straight line.

FIG. 28 is a flowchart describing an area sensor inclination angle acquiring unit in the present embodiment. In the present process, when an instruction is received from the user, the CPU (301) initiates the detection of the inclination of the area sensor. First, in the step S2801, a test chart placed on the platen is scanned.

The image illustrated in FIG. 26 is used as the test chart to be scanned. The test chart may be output from the same MFP as that for determining the inclination angle of the area sensor or output from another printing apparatus.

In the next step S2802, pixel sensors in the sensor that read a straight line on the test chart and output read density values considered to be the same value are searched and sorted.

The details of the above operation have been already described with reference to (a) and (b) of FIG. 27.

In the next step S2803, as having been illustrated in (a) of FIG. 27, it is determined whether there is a plurality of pixel sensors that has read a single straight line on the test chart and output read density values considered to be the same value.

When there is a plurality of such pixel sensors, the straight line on the test chart should pass through the centers of the pixel sensors. The inclination angle of the area sensor is therefore acquired from the distance between the pixel sensors (step S2808).

On the other hand, in the step S2803, when there is not a plurality of pixel sensors that have read a single straight line and output density values considered to be the same value as illustrated in (b) of FIG. 27, the control proceeds to the step S2804.

The density values of the pixel sensors adjacent to each other in the long-side direction are used to acquire the amount of deviation a from the line that is smaller than a single pixel.

In the next step S2805, the amount of deviation a acquired in the step S2804 is added in the long-side direction, and the inclination angle of the area sensor is acquired in consideration of the amount of deviation a smaller than a single pixel.

It is determined whether the inclination angle of the area sensor acquired in the step S2805 is greater than a threshold value (step S2806). When the inclination angle is greater than the threshold value, an error is displayed (step S2809).

The reason of displaying an error is that when the inclination angle is greater than the threshold value, the shift in phase between read frame image data adjacent to each other will not be small enough. In this case, frame image data necessary to perform super-resolution processing cannot be obtained.

When the inclination angle of the area sensor acquired in the step S2805 is not greater than the threshold value, the inclination angle of the area sensor is stored in a secondary storage device, such as an NVRAM (step S2807), and the process is terminated. The above operation corresponds to the step S2502 in FIG. 25.

The configuration in the present embodiment allows multiple sets of frame image data different from one another in terms of shift in phase on the order of sub-pixel to be obtained in a single scan action without major change in conventional configuration.

The inclination angle information acquiring unit described above is then used to correct the inclination of the resultant frame image data, as described in the first embodiment, and the corrected frame image data is used to perform the high-resolution processing described above. A high-resolution image can be thus provided.

(Third Embodiment)

In the second embodiment, the process of determining the inclination of an area sensor has been described. The process uses a method for acquiring deviation smaller than a single pixel by searching pixel sensors outputting high read density values among the pixel sensors that have read a straight line having a width corresponding to a single pixel and evaluating the density values of the pixels around each of the pixel sensors outputting high read density values.

In the present embodiment, an area sensor inclination angle information acquiring unit different from that in the second embodiment will be described.

As illustrated in FIG. 29, when the user places a straight line having a width corresponding to a single pixel that is drawn parallel to the secondary scan direction and the area sensor reads the straight line, the amount of change in density of pixels in a row where the density continuously changes in the Y-axis direction is used to acquire the inclination angle of the area sensor.

FIG. 29 is a diagram describing a process of acquiring the inclination of the area sensor by using the sensor to read a straight line having a width corresponding to a single pixel and finding an edge of the straight line. FIG. 29 illustrates a straight line 2901 having a width corresponding to a single pixel, pixel sensors 2902 to 2906 in a row m, and a pixel sensor 2907 in a row (m+1).

Now, let X be the distance between pixel sensors in the long-side direction, and Y be an edge distance in the short-side direction. The inclination angle can be acquired by using the following formula, which is similar to that in the first embodiment.

$$\theta = \arctan(X/Y)$$

In FIG. 29, for example, the pixel sensor 2902 is located on the straight line having a width corresponding to a single pixel, and outputs a read density value of 100%. Similarly, the pixel sensors 2903, 2904, 2905, 2906, and 2907 output read density values of 70%, 40%, 10%, 0%, and 80%, respectively. As described above, the read density value is proportional to the amount of deviation α.

In this case, the density detected by each of the sensors changes by 30%. That is, the rate of change in the amount of deviation α is 30%. The rate of change corresponds to the inclination of the straight line on the test chart. That is, the inclination is 0.3.

X and Y can be determined in consideration of the relationship between the pixel sensors 2903 and 2904. In this case, the amount of change X in the X-axis direction from the center of the pixel sensor 2903 to the center of the pixel sensor 2904 is 0.3N, and the amount of change Y in the Y direction is L. The inclination angle can be determined by using the formula θ=arc tan(0.3N/L).

Similarly, X and Y can be determined in consideration of the relationship between the pixel sensors 2903 and 2906. In this case, the amount of change X in the long-side direction is 1.2N, and the amount of change Y in the short-side direction is 4L. The inclination angle can be determined by using the formula θ=arc tan(1.2N/4L), leading to the same result.

The configuration of the pixel sensors in the present embodiment allows the inclination of the area sensor to be detected by detecting an edge. The inclination of the area sensor can therefore be detected irrespective of the width of a straight line used on the test chart. That is, even in an output apparatus that can hardly print a width corresponding to a single pixel, the inclination of the area sensor can be correctly detected.

As a result, a super-resolution image can be precisely formed by using correct angular information.

(Fourth Embodiment)

In the second and third embodiments, the area sensor inclination angle acquiring unit initiates its operation when the user issues an execution instruction and the CPU receives the instruction.

That is, once inclination angle information is acquired and the result is stored in the secondary storage device, the apparatus uses the stored inclination angle information to perform high-resolution conversion until the apparatus receives another instruction to acquire angular information.

In the present embodiment, the inclination angle acquiring unit is initiated when the number of scans, each of which is the reading action using the sensor, becomes greater than a certain number.

When the number of reading actions carried out by the apparatus reaches a number specified by one of the user and an administrator, the inclination angle acquiring unit is initiated. The number specified by the user is arbitrarily set.

For example, the certain number may be set to one. In this case, the inclination of the area sensor is detected for each scan action.

That is, the inclination angle is acquired before the high-resolution conversion is performed even when the user issues no instruction. It is thus possible to handle change in inclination angle of the area sensor due to change over time.

Further, for example, when a repair person replaces a malfunctioning area sensor with a new one, the process described above may be carried out.

As described above, the present embodiment can prevent degradation in high-resolution performance and inclination of an image caused by change over time, resulting in a configuration unlikely affected by change over time.

Further, when the acquired inclination angle θ is greater than a threshold value due to change over time, a warning may be issued to the user to prompt the user to carry out maintenance actions.

The threshold value in this case is the inclination angle of the area sensor when the reading position where pixel sensors adjacent to each other in the short-side direction read image data is shifted by a single pixel or greater in the primary scan direction.

In this case, since the condition "the shift of the reading position where pixel sensors adjacent to each other in the short-side direction read an original document image should be smaller than a single pixel in the primary scan direction," which is a condition necessary to carry out super-resolution processing, that is high-resolution processing, cannot be satisfied, appropriate super-resolution processing cannot be carried out.

(Other Embodiments)

The scope of the embodiments described above encompasses a method for storing a program on a storage medium, the program operating the configuration of any of the embodiments described above to achieve the functions of the embodiment, reading the program, as codes, stored in the storage medium, and executing the codes in a computer. Further, not only the storage medium on which the program is stored but also the program itself are encompassed in the embodiments described above.

Examples of the storage medium may include a floppy disk, a hard disk, an optical disk, a magneto-optical disk, a CD-ROM, a magnetic tape, a non-volatile memory card, and a ROM.

The scope of the embodiments described above encompasses not only those that use a program alone stored on any of the storage medium described above to carry out processes but also those operate on an OS in cooperation with other software and the function of an expansion board to carry out the actions in the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-330977, filed Dec. 21, 2007 and 2008-317282, filed Dec. 12, 2008, which are hereby incorporated by reference herein in their entirety.

The invention claimed is:

1. An image processing apparatus comprising:
an area sensor unit configured to read image data corresponding to a plurality of frames shifted from each other by a shift of less than one pixel;
an inclination angle acquiring unit configured to acquire an inclination angle with respect to a reference installation position of the area sensor;
an angle correcting unit configured to correct the inclination of the image data corresponding to a plurality of frames read by the area sensor unit by using the inclination angle acquired by the inclination angle acquiring unit; and
a high-resolution conversion unit configured to provide image data the resolution of which is higher than the resolution of the read image data by using the image data corresponding to a plurality of frames the inclination of which has been corrected by the angle correcting unit to perform interpolation processing.

2. The image processing apparatus according to claim 1, wherein when the area sensor unit is used to read a straight line drawn on an original document image, the inclination angle acquiring unit acquires the inclination angle by detecting read density values of two sensor components for a pixel, among sensor components for a pixel that form the area sensor, on the straight line and calculating the inclination angle of the area sensor.

3. The image processing apparatus according to claim 1, wherein whenever the area sensor unit reads an original document image arbitrarily determined times, the inclination angle is acquired.

4. The image processing apparatus according to claim 2, wherein whenever the area sensor unit reads an original document image arbitrarily determined times, the inclination angle is acquired.

5. The image processing apparatus according to claim 1, further comprising a warning unit configured to warn a user when the angle acquired by the inclination angle acquiring unit is greater than a threshold value so that the area sensor unit cannot read image data corresponding to a plurality of frames shifted from each other by a shift of less than one pixel.

6. The image processing apparatus according to claim 2, further comprising a warning unit configured to warn a user when the angle acquired by the inclination angle acquiring unit is greater than a threshold value so that the area sensor unit cannot read image data corresponding to a plurality of frames shifted from each other by a shift of less than one pixel.

7. The image processing apparatus according to claim 3, further comprising a warning unit configured to warn a user when the angle acquired by the inclination angle acquiring unit is greater than a threshold value so that the area sensor unit cannot read image data corresponding to a plurality of frames shifted from each other by a shift of less than one pixel.

8. The image processing apparatus according to claim 4, further comprising a warning unit configured to warn a user when the angle acquired by the inclination angle acquiring unit is greater than a threshold value so that the area sensor unit cannot read image data corresponding to a plurality of frames shifted from each other by a shift of less than one pixel.

9. An image processing apparatus comprising:
an area sensor unit configured to read image data corresponding to a plurality of frames shifted from each other by a shift of less than one pixel;
a high-resolution conversion unit configured to provide image data the resolution of which is higher than the resolution of the read image data by using the image data corresponding to a plurality of frames read by the area sensor unit to perform interpolation processing;
an inclination angle acquiring unit configured to acquire an inclination angle indicating the inclination with respect to a reference installation position of the area sensor; and
an angle correcting unit configured to correct the inclination of the high-resolution image data acquired by the high-resolution conversion unit by using the inclination angle acquired by the inclination angle acquiring unit.

10. The image processing apparatus according to claim 9, wherein when the area sensor unit is used to read a straight line drawn on an original document image, the inclination angle acquiring unit acquires the inclination angle by detecting read density values of two sensor components for a pixel, among sensor components for a pixel that form the area sensor, on the straight line and calculating the inclination angle of the area sensor.

11. The image processing apparatus according to claim 9, wherein whenever the area sensor unit reads an original document image arbitrarily determined times, the inclination angle is acquired.

12. The image processing apparatus according to claim 10, wherein whenever the area sensor unit reads an original document image arbitrarily determined times, the inclination angle is acquired.

13. The image processing apparatus according to claim 9, further comprising a warning unit configured to warn a user when the angle acquired by the inclination angle acquiring unit is greater than a threshold value so that the area sensor unit cannot read image data corresponding to a plurality of frames shifted from each other by a shift of less than one pixel.

14. The image processing apparatus according to claim 10, further comprising a warning unit configured to warn a user when the angle acquired by the inclination angle acquiring unit is greater than a threshold value so that the area sensor unit cannot read image data corresponding to a plurality of frames shifted from each other by a shift of less than one pixel.

15. The image processing apparatus according to claim 11, further comprising a warning unit configured to warn a user when the angle acquired by the inclination angle acquiring unit is greater than a threshold value so that the area sensor unit cannot read image data corresponding to a plurality of frames shifted from each other by a shift of less than one pixel.

16. The image processing apparatus according to claim 12, further comprising a warning unit configured to warn a user when the angle acquired by the inclination angle acquiring unit is greater than a threshold value so that the area sensor unit cannot read image data corresponding to a plurality of frames shifted from each other by a shift of less than one pixel.

17. An image processing method used in an image processing apparatus including an area sensor unit that reads image data corresponding to a plurality of frames shifted from each other by a shift of less than one pixel, the method comprising the steps of:
acquiring an inclination angle with respect to a reference installation position of the area sensor;
correcting the inclination of the image data corresponding to a plurality of frames read by the area sensor unit by using the inclination angle acquired in the inclination angle acquiring step; and
providing image data the resolution of which is higher than the resolution of the read image data by using the image data corresponding to a plurality of frames the inclination of which has been corrected in the angle correcting step to perform interpolation processing.

18. The image processing method according to claim 17, wherein when the area sensor unit is used to read a straight line drawn on an original document image, the inclination angle acquiring step is used to acquire the inclination angle by detecting read density values of two sensor components for a pixels, among sensor components for a pixels that form the area sensor, on the straight line and calculating the inclination angle of the area sensor.

19. The image processing method according to claim 17, wherein whenever the area sensor unit reads an original document image arbitrarily determined times, the inclination angle is acquired.

20. The image processing method according to claim 18, wherein whenever the area sensor unit reads an original document image arbitrarily determined times, the inclination angle is acquired.

21. The image processing method according to claim 17, further comprising warning a user when the angle acquired in the inclination angle acquiring step is greater than a threshold value so that the area sensor unit cannot read image data corresponding to a plurality of frames shifted from each other by a shift of less than one pixel.

22. The image processing method according to claim 18, further comprising warning a user when the angle acquired in the inclination angle acquiring step is greater than a threshold value so that the area sensor unit cannot read image data corresponding to a plurality of frames shifted from each other by a shift of less than one pixel.

23. The image processing method according to claim 19, further comprising warning a user when the angle acquired in the inclination angle acquiring step is greater than a threshold value so that the area sensor unit cannot read image data corresponding to a plurality of frames shifted from each other by a shift of less than one pixel.

24. The image processing method according to claim 20, further comprising warning a user when the angle acquired in the inclination angle acquiring step is greater than a threshold value so that the area sensor unit cannot read image data corresponding to a plurality of frames shifted from each other by a shift of less than one pixel.

25. An image processing method used in an image processing apparatus including an area sensor unit that reads image data corresponding to a plurality of frames shifted from each other by a shift of less than one pixel, the method comprising the steps of:
   providing image data the resolution of which is higher than the resolution of the read image data by using the image data corresponding to a plurality of frames read by the area sensor unit to perform interpolation processing;
   acquiring an inclination angle indicating the inclination with respect to a reference installation position of the area sensor; and
   correcting the inclination of the high-resolution image data acquired in the high-resolution conversion step by using the inclination angle acquired in the inclination angle acquiring step.

26. The image processing method according to claim 25, wherein when the area sensor unit is used to read a straight line drawn on an original document image, the inclination angle acquiring step is used to acquire the inclination angle by detecting read density values of two sensor components for a pixel, among sensor components for a pixel that form the area sensor, on the straight line and calculating the inclination angle of the area sensor.

27. The image processing method according to claim 25, wherein whenever the area sensor unit reads an original document image arbitrarily determined times, the inclination angle is acquired.

28. The image processing method according to claim 26, wherein whenever the area sensor unit reads an original document image arbitrarily determined times, the inclination angle is acquired.

29. The image processing method according to claim 25, further comprising warning a user when the angle acquired in the inclination angle acquiring step is greater than a threshold value so that the area sensor unit cannot read image data corresponding to a plurality of frames shifted from each other by a shift of less than one pixel.

30. The image processing method according to claim 26, further comprising warning a user when the angle acquired in the inclination angle acquiring step is greater than a threshold value so that the area sensor unit cannot read image data corresponding to a plurality of frames shifted from each other by a shift of less than one pixel.

31. The image processing method according to claim 27, further comprising warning a user when the angle acquired in the inclination angle acquiring step is greater than a threshold value so that the area sensor unit cannot read image data corresponding to a plurality of frames shifted from each other by a shift of less than one pixel.

32. The image processing method according to claim 28, further comprising warning a user when the angle acquired in the inclination angle acquiring step is greater than a threshold value so that the area sensor unit cannot read image data corresponding to a plurality of frames shifted from each other by a shift of less than one pixel.

33. A non-transitory computer readable medium that stores a program that causes an image processing apparatus including an area sensor unit that reads image data corresponding to a plurality of frames shifted from each other by a shift of less than one pixel to perform the steps of:
   acquiring an inclination angle with respect to a reference installation position of the area sensor;
   correcting the inclination of the image data corresponding to a plurality of frames read by the area sensor unit by using the inclination angle acquired in the inclination angle acquiring step; and
   providing image data the resolution of which is higher than the resolution of the read image data by using the image data corresponding to a plurality of frames the inclination of which has been corrected in the angle correcting step to perform interpolation processing.

34. A non-transitory computer readable medium that stores a program that causes an image processing apparatus including an area sensor unit that reads image data corresponding to a plurality of frames shifted from each other by a shift of less than one pixel to perform the steps of:
   providing image data the resolution of which is higher than the resolution of the read image data by using the image data corresponding to a plurality of frames read by the area sensor unit to perform interpolation processing;
   acquiring an inclination angle indicating the inclination with respect to a reference installation position of the area sensor; and
   correcting the inclination of the high-resolution image data acquired in the high-resolution conversion step by using the inclination angle acquired in the inclination angle acquiring step.

* * * * *